(12) United States Patent
Feng

(10) Patent No.: US 6,179,208 B1
(45) Date of Patent: *Jan. 30, 2001

(54) PORTABLE DATA COLLECTION DEVICE WITH VARIABLE FOCUSING MODULE FOR OPTIC ASSEMBLY

(75) Inventor: Chen Feng, Bothell, WA (US)

(73) Assignee: Metanetics Corporation, Woodlands, TX (US)

( * ) Notice: Under 35 U.S.C. 154(b), the term of this patent shall be extended for 0 days.

This patent is subject to a terminal disclaimer.

(21) Appl. No.: 09/197,175

(22) Filed: Nov. 20, 1998

Related U.S. Application Data

(63) Continuation-in-part of application No. 08/824,288, filed on Mar. 26, 1997, now abandoned, which is a continuation-in-part of application No. 08/797,552, filed on Jan. 31, 1997, now Pat. No. 5,949,057.

(51) Int. Cl.[7] ........................................... G06K 7/10
(52) U.S. Cl. ............... 235/472.01; 235/462.24; 235/462.45
(58) Field of Search .................. 235/472.01, 462.01, 235/462.09, 462.24, 462.25, 462.45

(56) References Cited

U.S. PATENT DOCUMENTS

| | | |
|---|---|---|
| 4,210,802 | 7/1980 | Sakai . |
| 4,409,470 | 10/1983 | Shepard et al. . |

(List continued on next page.)

FOREIGN PATENT DOCUMENTS

| | | |
|---|---|---|
| 60-129891 | 7/1985 | (JP) . |
| 63-67692 | 3/1988 | (JP) . |
| 63-83886 | 4/1988 | (JP) . |
| 60-264383 | 10/1990 | (JP) . |
| 3-198175 | 8/1991 | (JP) . |
| 5-242287 | 9/1993 | (JP) . |
| 6-162247 | 6/1994 | (JP) . |

OTHER PUBLICATIONS

PCT International Search Report dated Sep. 18, 1996 (two pages).

PCT International Search Report dated Nov. 7, 1996 (one page).

Title: *Metanetics Corporation IR–2000 Hand Held Image Reader User's Guide*. To the best of Applicant's knowledge, this publication more than one year prior to the filing date of the above–named patent application.

\* cited by examiner

Primary Examiner—Karl D. Frech
Assistant Examiner—Daniel St. Cyr
(74) Attorney, Agent, or Firm—Watts, Hoffmann, Fisher & Heinke, Co., L.P.A.

(57) ABSTRACT

A portable data collection device including an imaging assembly including a two dimensional (2D) photosensor array. The imaging assembly is selectively actuatable with a first trigger for reading a target dataform in the imaging assembly's target area and actuatable with a second trigger for capturing a image of the target object in the target area. The device also includes an illumination assembly including an circuit board assembly supporting illumination and targeting light emitting diodes and a lens array or panel positioned adjacent the circuit board assembly for focusing an even pattern of illumination on the target area and generating a crosshair illumination pattern for aiming the device at the target dataform. The device further includes an optic assembly for focusing reflected illumination from the target area onto the two dimensional photosensor array. The optic assembly includes a focusing optic for changing a best focus distance of the optic assembly as a function of moving a wedge shaped optic with respect to a stationary optic to change a thickness of the focusing optic.

10 Claims, 20 Drawing Sheets

U.S. PATENT DOCUMENTS

| | | |
|---|---|---|
| 4,734,566 | 3/1988 | Senda et al. . |
| 4,766,300 | 8/1988 | Chadima, Jr. et al. . |
| 4,835,615 | 5/1989 | Taniguchi et al. . |
| 4,877,949 | 10/1989 | Danielson et al. . |
| 4,952,966 | 8/1990 | Ishida et al. . |
| 4,962,432 | 10/1990 | Ohtsuka et al. . |
| 4,996,413 | 2/1991 | McDaniel et al. . |
| 5,010,580 | 4/1991 | Vincent et al. . |
| 5,019,699 | 5/1991 | Koenck . |
| 5,025,319 | 6/1991 | Mutoh et al. . |
| 5,080,456 | 1/1992 | Katz et al. . |
| 5,083,150 | 1/1992 | Nagasaki et al. . |
| 5,128,769 | 7/1992 | Aria et al. . |
| 5,130,520 | 7/1992 | Shepard et al. . |
| 5,131,053 | 7/1992 | Bernzott et al. . |
| 5,168,149 | 12/1992 | Dvorkis et al. . |
| 5,184,005 | 2/1993 | Ukai et al. . |
| 5,187,356 | 2/1993 | Chadima, Jr. et al. . |
| 5,200,597 | 4/1993 | Eastman et al. . |
| 5,210,398 | 5/1993 | Metlitsky . |
| 5,235,167 | 8/1993 | Dvorkis et al. . |
| 5,237,365 | 8/1993 | Miyazawa . |
| 5,243,666 | 9/1993 | Hasegawa et al. . |
| 5,245,445 | 9/1993 | Fujisawa et al. . |
| 5,258,604 | 11/1993 | Behrens et al. . |
| 5,262,871 | 11/1993 | Wilder et al. . |
| 5,272,538 | 12/1993 | Homma et al. . |
| 5,276,315 | 1/1994 | Surka . |
| 5,278,397 | 1/1994 | Barkan et al. . |
| 5,291,009 | 3/1994 | Roustaei . |
| 5,293,238 | 3/1994 | Nakano et al. . |
| 5,296,690 | 3/1994 | Chandler et al. . |
| 5,308,960 | 5/1994 | Smith et al. . |
| 5,308,966 | 5/1994 | Danielson et al. . |
| 5,309,243 | 5/1994 | Tsai . |
| 5,314,631 | 5/1994 | Katoh et al. . |
| 5,315,095 | 5/1994 | Marom et al. . |
| 5,319,181 | 6/1994 | Shellhammer et al. . |
| 5,331,143 | 7/1994 | Marom et al. . |
| 5,332,892 | 7/1994 | Li et al. . |
| 5,340,973 | 8/1994 | Knowles et al. . |
| 5,345,266 | 9/1994 | Denyer . |
| 5,349,172 | 9/1994 | Roustaei . |
| 5,352,884 | 10/1994 | Petrick et al. . |
| 5,354,977 | 10/1994 | Roustaei . |
| 5,359,185 | 10/1994 | Hanson . |
| 5,386,271 | 1/1995 | Maekawa et al. . |
| 5,401,949 | 3/1995 | Ziemacki et al. . |
| 5,406,063 | 4/1995 | Jelen . |
| 5,408,084 | 4/1995 | Brandorff et al. . |
| 5,414,251 | 5/1995 | Durbin . |
| 5,418,357 | 5/1995 | Inoue et al. . |
| 5,420,635 | 5/1995 | Konishi et al. . |
| 5,420,943 | 5/1995 | Mak . |
| 5,448,293 | 9/1995 | Kogane et al. . |
| 5,468,947 | 11/1995 | Danielson et al. . |
| 5,468,950 | 11/1995 | Hanson . |
| 5,478,997 | 12/1995 | Bridgeall et al. . |
| 5,479,011 * | 12/1995 | Rudeen et al. ................. 235/472.01 |
| 5,484,994 | 1/1996 | Roustaei . |
| 5,486,688 | 1/1996 | Iima et al. . |
| 5,496,992 | 3/1996 | Madan et al. . |
| 5,504,316 | 4/1996 | Bridgall et al. . |
| 5,559,555 | 9/1996 | Shimzu et al. . |
| 5,703,349 * | 12/1997 | Meyerson et al. ................... 235/472 |
| 5,714,745 * | 2/1998 | Ju et al. ............................... 235/469 |
| 5,717,195 * | 2/1998 | Feng et al. ........................... 235/470 |
| 5,949,057 * | 9/1999 | Feng ................................ 235/472.01 |

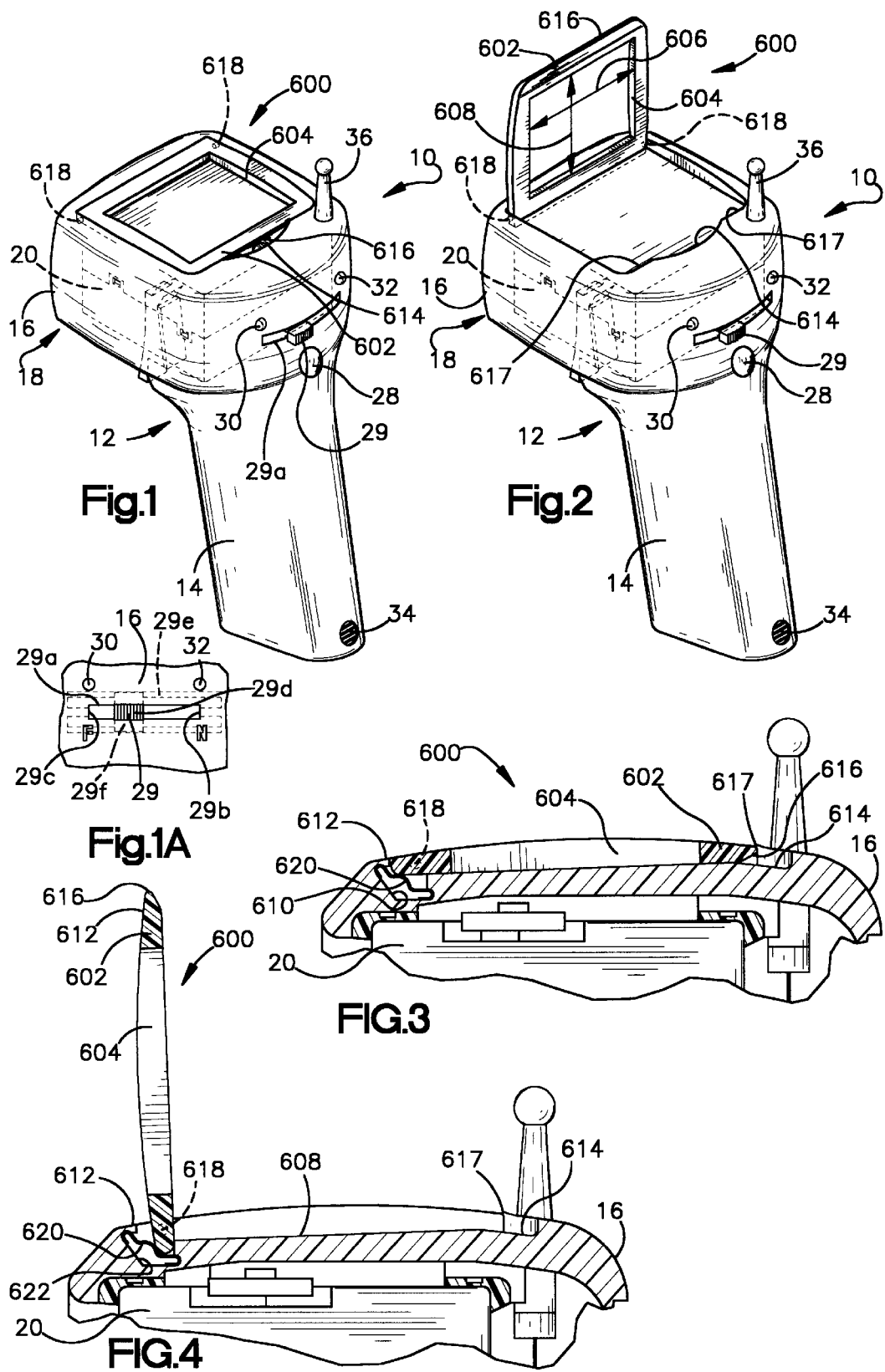

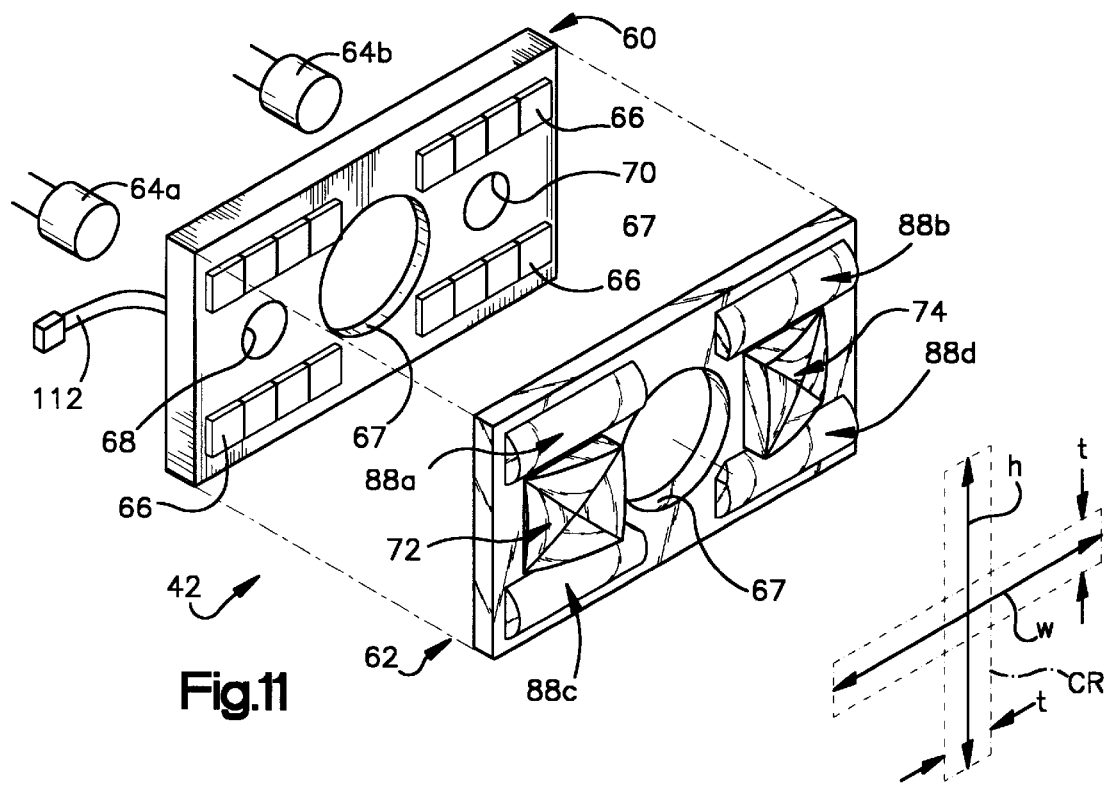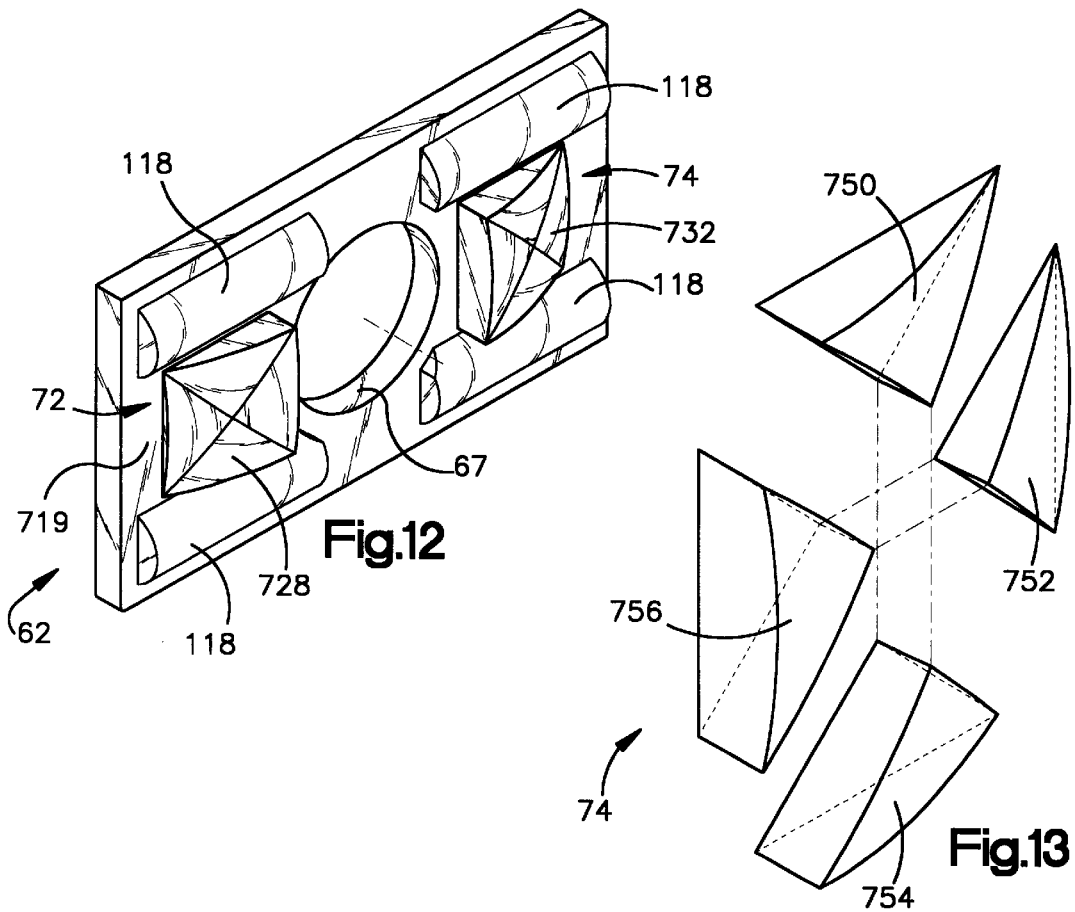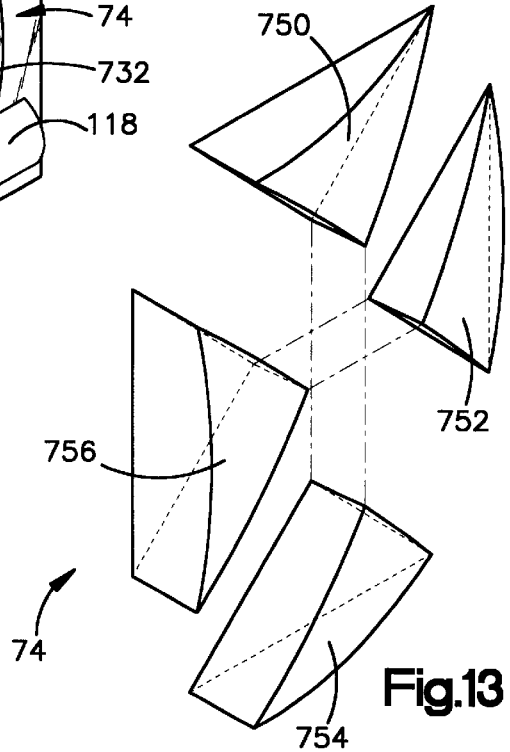

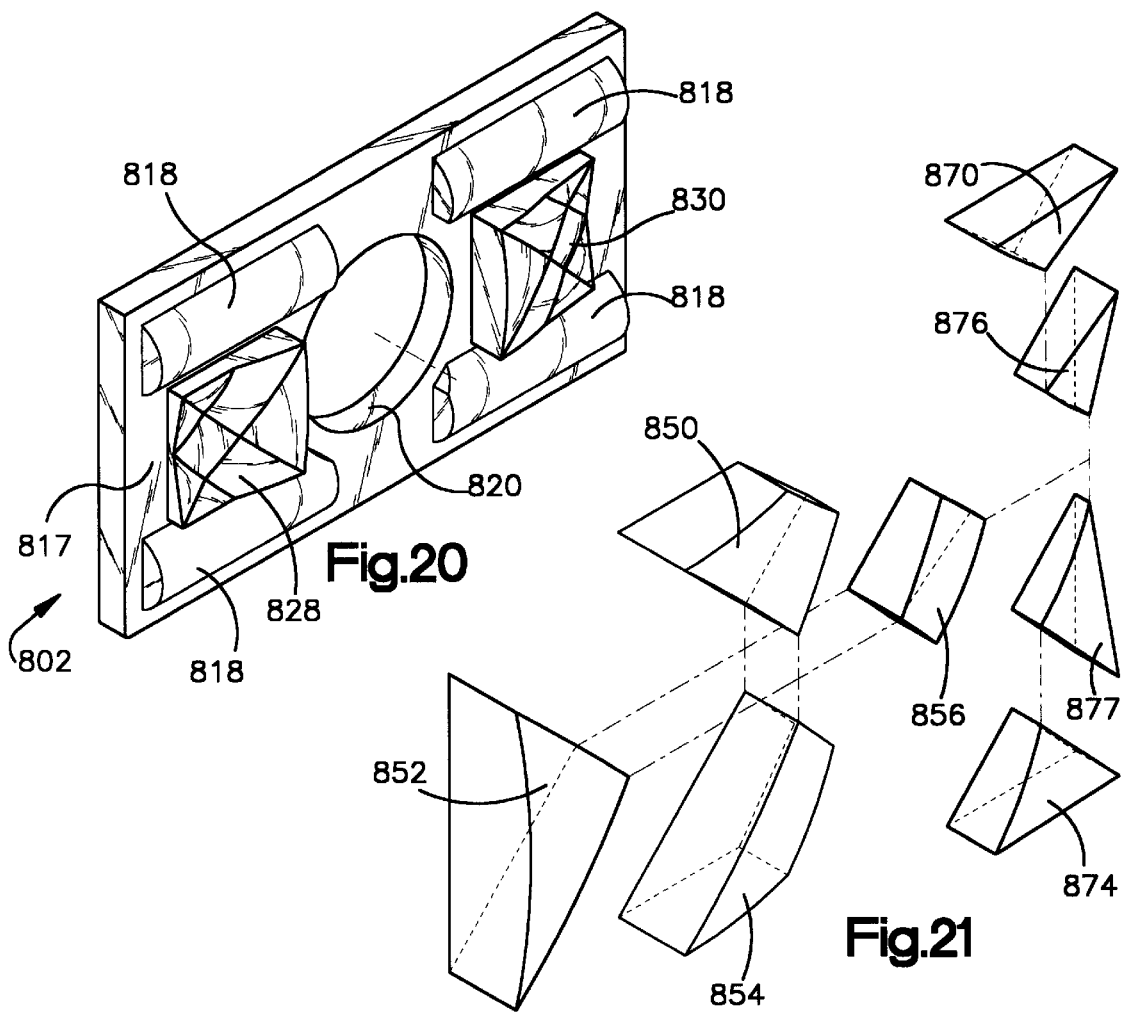
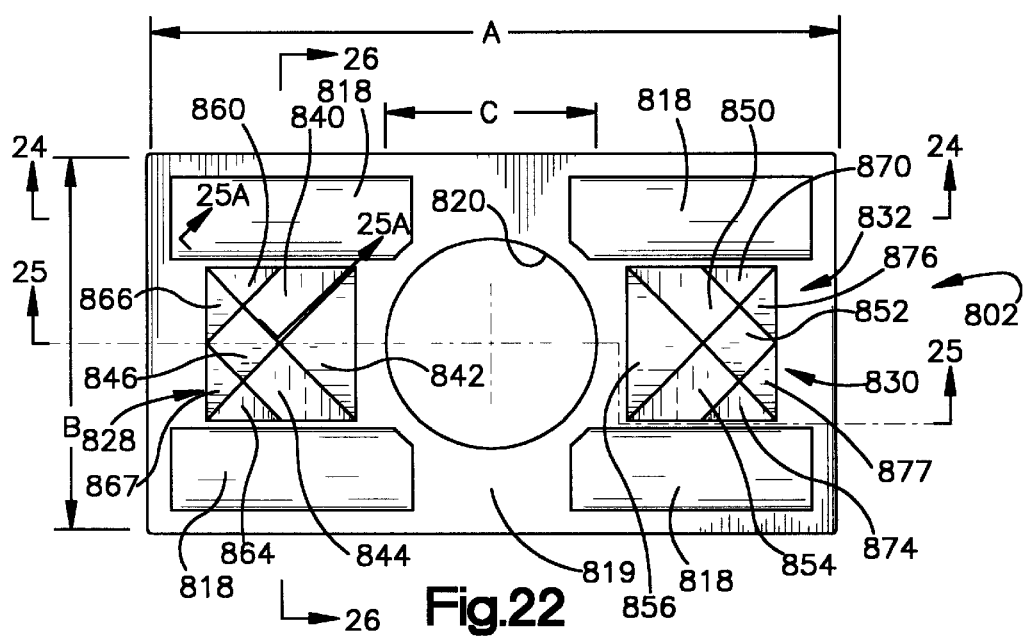

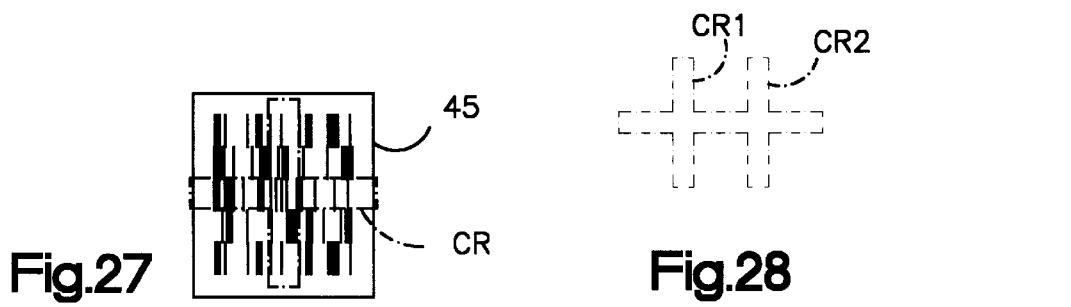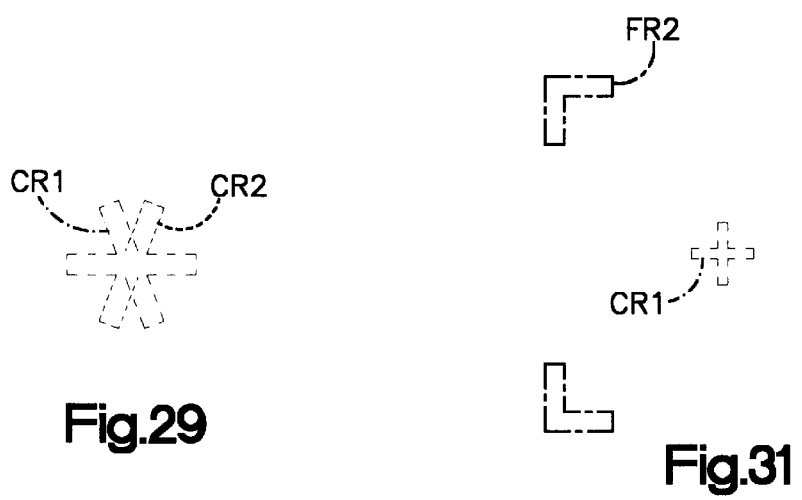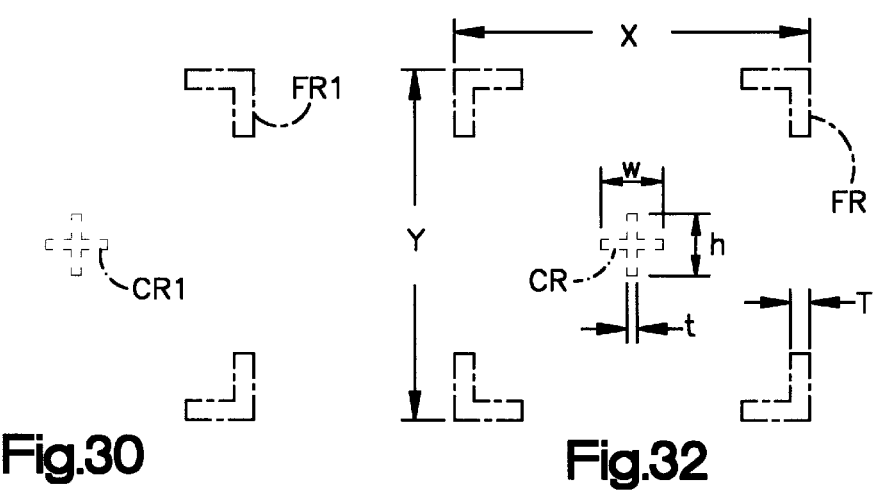

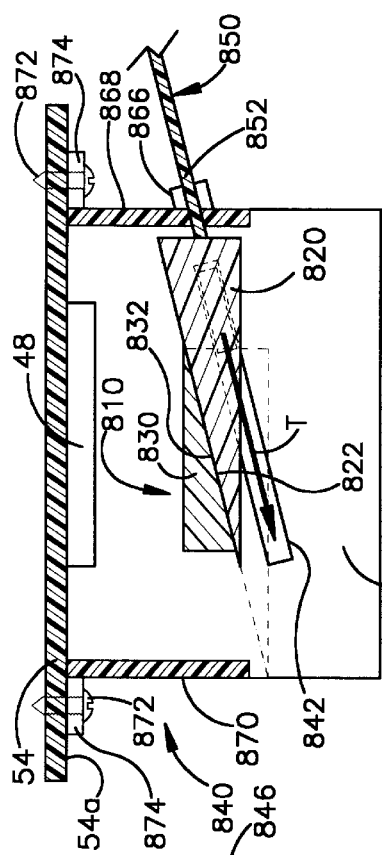
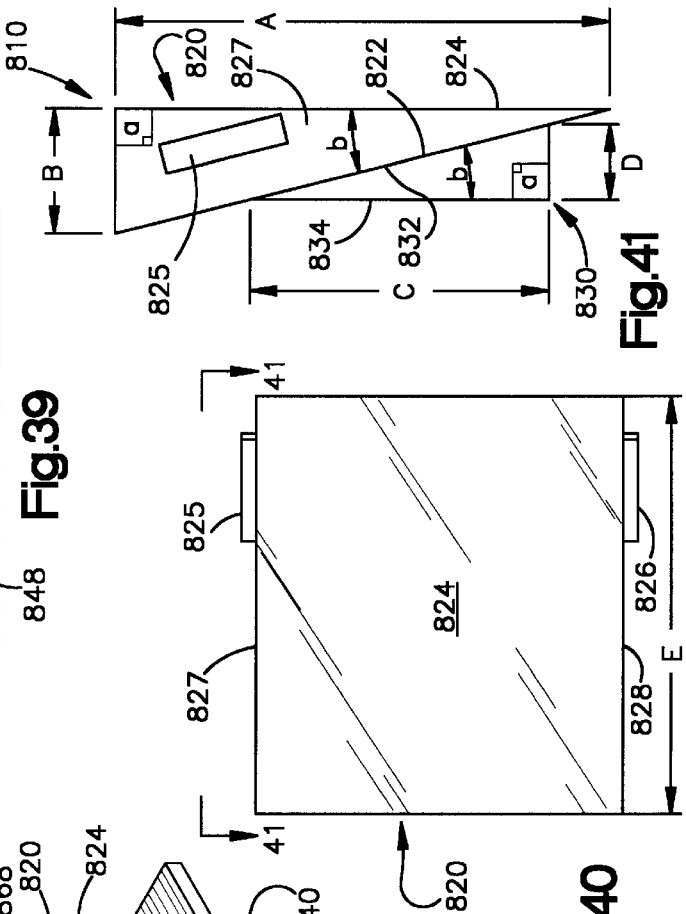
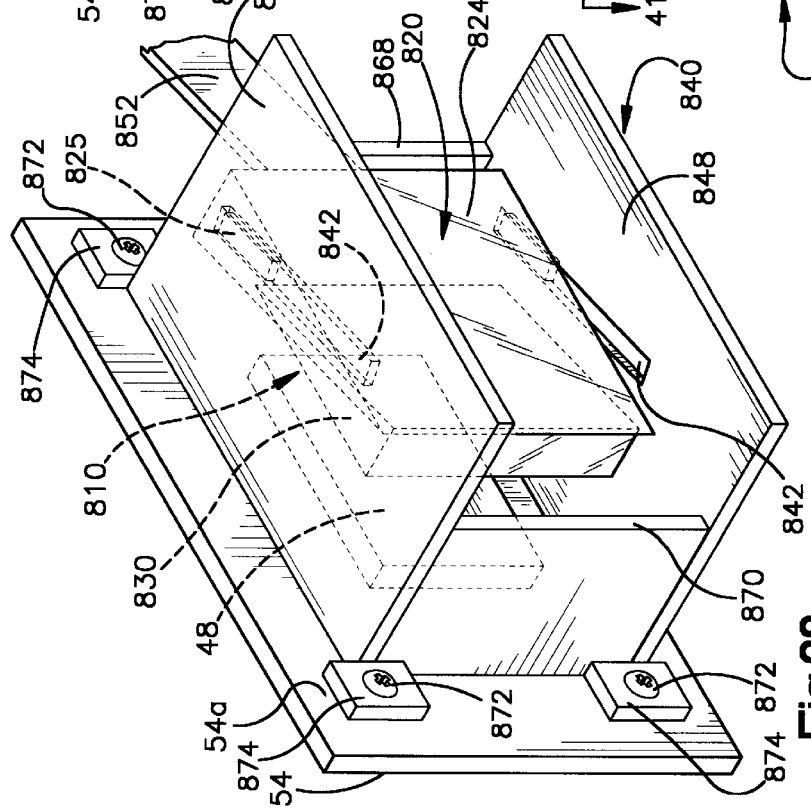
Fig.39
Fig.41
Fig.40
Fig.38

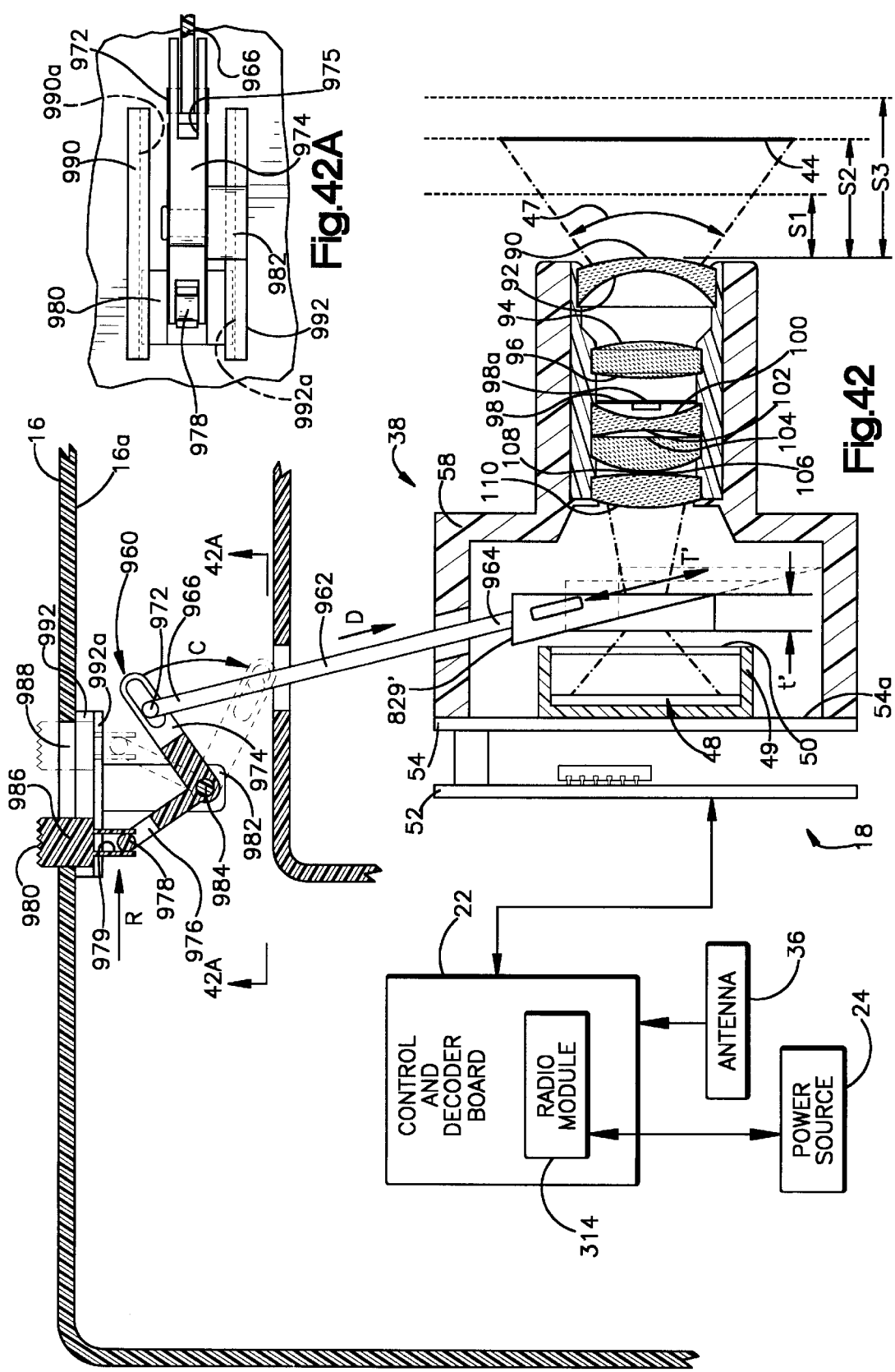

PORTABLE DATA COLLECTION DEVICE WITH VARIABLE FOCUSING MODULE FOR OPTIC ASSEMBLY

CROSS REFERENCE TO RELATED APPLICATIONS

This application is a continuation-in-part of U.S. application Ser. No. 08/824,288, filled Mar. 26, 1997, entitled Portable Data Collection Device With Variable Focusing Assembly, now abandoned and U.S. Ser. No. 08/797,552 filed Jan. 31, 1997 entitled "Portable Data Collection Device With Crosshair Targeting Illumination Assembly, now issued as U.S. Pat. No. 5,949,057 on Sep. 7, 1999. The aforesaid copending applications are incorporated herein in their entireties by reference.

FIELD OF THE INVENTION

The present invention relates to a portable data collection device including a two dimensional photosensor array imaging assembly anu, more particularly, to a portable data collection device having a two dimensional photosensor array imaging assembly selectively actuatable to read a bar code dataform and record an image of an item of interest and further having an optic assembly with a variable focusing module to change a best focus distance of the optic assembly.

BACKGROUND OF THE INVENTION

Portable data collection devices are widely used in manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, etc. for inventory control, tracking, production control and expediting, quality assurance and other purposes. Various bar code dataform readers have been proposed for portable data collection devices including laser scanners and one dimensional (1D) charge coupled device (CCD) imaging assemblies, both of which are capable of reading 1D bar code dataforms, that is, bar codes consisting of a single row of contrasting black bars and white spaces of varying widths. Both of these readers are also capable of reading a "stacked" two dimensional (2D) bar code dataforms such as PDF-417, which has row indicator patterns utilized by the reader for vertical synchronization.

A two dimensional (2D) imaging based dataform reader has been proposed in U.S. application Ser. No. 08/544,618, filed Oct. 18, 1995 and entitled "Extended Working Range Dataform Reader Including Fuzzy Logic Image Control Circuitry", now issued as U.S. Pat. No. 5,702,059 on Dec. 30, 1997. The 2D dataform reader disclosed in application Ser. No. 08/544,618, includes an imaging assembly having a two dimensional array of photosensors or photodiodes adapted to read 2D bar code dataforms (e.g., PDF-417, Supercode, etc.) with vertical synchronization row indicator patterns as well as matrix dataforms (e.g., MaxiCode, Data Matrix, Code 1, etc.) which do not include vertical synchronization patterns. The photosensors correspond to image pixels of a captured image frame and the terms "photosensors" and "pixels" will be used interchangeably. The 2D dataform reader disclosed in U.S. Pat. No. 5,703,059 utilizes an open loop feedback control system including fuzzy logic circuitry to determine proper exposure time and gain parameters for a camera assembly. U.S. Pat. No. 5,702,059 is incorporated in its entirety herein by reference.

While using a portable data collection device to sequentially read bar code dataforms affixed to products or containers in a production facility, warehouse or retail store, an operator may come upon an item which is damaged, incomplete, mislabeled, in the wrong location, etc. In such a event, it would be desirable for the operator to make a note of the problem item so that appropriate corrective action may be taken by supervisory personnel. However, requiring the operator to make a handwritten notation on a clipboard or input information concerning the item using a keyboard or keypad of the portable data collection device is both time consuming and error prone. What is needed is a portable data collection device having a 2D imaging assembly that can be actuated to read bar code dataforms by depressing a trigger and, when a problem item is found, the imaging assembly can be actuated with a separate trigger to record an image of the problem item. This would enable "information", that is, an image of the problem item, to be recorded without seriously interrupting the normal course of the operator's work. Additionally, it would be desirable to transmit the recorded image of the problem item to appropriate supervisory personnel so that appropriate corrective action may be taken. In certain instances, it may be sufficient to record a single frame of the image of a problem item, while in other cases, for example, if the item is larger than a field of view or target area of the imaging assembly, it may be necessary to record a continuous video image of the problem item to permit the operator to record a complete view of the item. It would also be desirable to provide an audio capture module to simultaneously capture the operator's voice, enabling the operator to provide further identification and/or commentary on the problem item to aid supervisory personnel in locating the item and taking appropriate corrective action.

Additionally, what is needed is a portable data collection device including an illumination assembly and a viewing assembly to assist the operator in properly aiming and positioning the portable data collection device with respect to a target object such that the target object is within a target area of the imaging assembly. A size of a target area of the imaging assembly is defined by a field of view of the imaging assembly and a distance between the imaging assembly and the target object. The target object may be a dataform to be read or an item to be imaged. Preferably the illumination assembly will include targeting optics which will project a "crosshair" shaped targeting beam of visible light corresponding to the field of view of the imaging assembly to aid an operator in aiming the device at the target object.

A viewing assembly would permit the operator to visualize the target area and the target object. Visualizing the target area of the image assembly would facilitate proper alignment of the target area and the target object thus insuring that the device is properly aimed. Further, visualizing the imaging target area and the target object would aid the operator in positioning the device relative to the target object such that the target object is encompassed within an outer perimeter of the target area.

Furthermore, in package delivery applications, upon delivery of a package, the delivery person typically uses a portable data collection device to read a bar code dataform affixed to the delivered package. Normally, the delivery person also obtains a signature of the person receiving the package. Typically, the signature of the person receiving the package is on a sheet of paper that must be filed with the package delivery records or on a signature capture digitizer pad so that the signature may electronically filed.

What is needed is a portable data collection device having a 2D imaging assembly that can be actuated to read a bar code dataform by depressing one trigger and can be actuated by a separate trigger, or applications software, to record an image of a signature of a person receiving a package so that the signature can be filed electronically.

As an alternative to using one trigger to read a bar code dataform and using the second trigger to image an adjacent signature block with a recipient's signature included therein a single trigger could be used to image and decode a dataform and capture an image of the recipient's signature. If the dataform includes encoded data regarding the position of the signature block with respect to the dataform, output data could include decoded dataform data and data representing the portion of the captured image corresponding to the signature block area. What is needed is a portable data collection device that can be actuated by a single trigger to capture an image of a bar code dataform and an adjacent signature block, decode the bar code dataform, determine the position of the signature block, and output a compressed digitized representation of the portion of the image comprising the signature block for subsequent downloading to a remote device.

What is also needed is an optic assembly for focusing an image of the target area onto a two dimensional photosensor array wherein the optic assembly includes a focusing module to permit the best focusing distance of the optic assembly to be changed by the operator manually or changed automatically in response to a signal representative of the sharpness of an image of a target area.

SUMMARY OF THE INVENTION

In accordance with this invention, a portable data collection device is provided that includes a two dimensional (2D) photosensor array imaging assembly selectively actuatable for reading bar code dataforms (bar code dataform reading mode) and recording an image of an item in the imaging assembly's target area (imaging mode). A size of the target area is dependent on a field of view of the imaging assembly and a distance between the imaging assembly and a target object, the object being either a dataform to be read or an item to be imaged. The portable data collection device includes two trigger switches, a first trigger actuatable for reading a bar code dataform and a second trigger actuatable for recording an image of an item in the target area. In a radio embodiment of the portable data collection device of the present invention, a radio module is provided for transmitting an output signal to a remote device. In a batch embodiment of the portable data collection device of the present invention, an output signal is coupled to a terminal processing board for further processing and storage.

The imaging assembly of the portable data collection device of the present invention further includes control and selection circuitry which receives input signals from an operator of the portable data collection device and determines and formats an appropriate output signal. The output signal may include data from a decoded dataform imaged in a captured image frame, a compressed representation of a captured image, an uncompressed representation of a captured image, or a combination of these. If the desired output signal is decoded dataform data, the selection circuitry will utilize image processing and decoding circuitry to decode the dataform.

Alternately, if the desired output signal is to represent an image of a field of view of a camera assembly of the imaging assembly, the selection circuitry may output the entire frame of image data from the buffer memory or, if appropriate, invoke a compression module to compress the image to reduce the quantity of data to be transmitted by a radio module of the portable data collection device to a remote device or to be output to a terminal processing board of the portable data collection device.

As discussed, the portable data collection device of the present invention includes two manually activated trigger switches for controlling the selection circuitry to select between a imaging capture mode and a dataform decoding mode. A first trigger switch, the dataform decoding trigger, institutes the dataform decoding mode and signals the selection circuitry to output a decoded representation of a dataform in a captured image frame. The second trigger switch, the imaging trigger, institutes the imaging mode and has two operating embodiments. In the first operating embodiment of the imaging mode, depressing the imaging trigger results in the imaging assembly capturing one frame of the field of view or target area of the camera assembly. In the second operating embodiment of the imaging mode, depressing the imaging trigger results in the imaging assembly continuously capturing successive frames as long as the trigger is depressed.

In a third operating embodiment of the portable data collection device of the present invention, activation of the dataform reading trigger will result in both decoded data and at least a portion of the captured image frame being output. This embodiment would advantageously be employed in a situation where a dataform is associated with, for example, a signature block in proximity to the dataform wherein the dataform includes encoded data setting forth the position of the signature block with respect to some predetermined location on the dataform. When the dataform decoding trigger is actuated, an image of the dataform and associated signature block is captured. The dataform is decoded and the decoded data is analyzed by the selection circuitry to determine the location of the signature block. The output signal includes both the decoded data and an image of the signature block.

Advantageously, the portable data collection device of the present invention includes a voice capture module which captures and digitizes sound received through a microphone mounted on the device during actuation of the second trigger. This feature enables an operator to "attach" a verbal message to the captured image. The digitized signal representing the captured sound portion is processed by a voice compression module prior to output to the radio module or the terminal processing board.

The imaging assembly includes a board camera assembly having a photosensor array assembly including a two dimensional (2D) array of photosensors or pixels and a control and decoder board. The control and decoder board includes decoding circuitry, image compression circuitry, control and selection circuitry, serial output circuitry, exposure parameter control circuitry and image buffering circuitry including signal processing circuitry and a frame buffer memory. The signal processing circuitry includes synchronization extractor circuitry and analog to digital (A/D) converter circuitry for converting a composite video signal generated by the board camera assembly to digital image data. The decoding circuitry includes a decoder for decoding 1D and 2D bar code dataforms. The exposure parameter control circuitry includes fuzzy logic control circuitry for controlling the frame exposure period and gain adjustment of the board camera assembly.

The imaging assembly further includes an illumination assembly for illuminating a target item in the imaging assembly target area and an optic assembly for focusing reflected light from the target area upon the 2D array of photosensors of the photosensor array assembly.

The optic assembly includes a plurality of lens positioned to the front of the 2D photosensor array for focusing reflected light from the target area onto the photosensor array. A shroud supports the optic assembly and shrouds ambient illumination from the photosensor array. The optic assembly also includes a variable focusing module for varying the best focus distance of the optic assembly. The focusing module of the present invention permits clear imaging of an object as near as 5.5 inches (140 mm.) from a front lens of the optic assembly to as far as 36 inches (915 mm.) from the optic assembly, that is, the focusing module provides for a best focus range of 5.5 inches to 36 inches.

The board camera assembly includes the 2D photosensor array, exposure period control circuitry and gain control circuitry mounted on a printed circuit board. The illumination assembly includes an array of LED illuminators for uniformly illuminating the target area and two targeting LED illuminators for generating a cross hair illumination intensity pattern for aiming the portable data collection device appropriately. In a first embodiment of the illumination assembly, a lens array is disclosed having a first targeting optics which generates a first crosshair illumination pattern and a second targeting optics generating a second crosshair illumination pattern, the first and second illumination patterns coinciding at distance corresponding to a minimum value of the best focus range of the optic assembly, that is, at a distance approximately 5.5 inches (140 mm.) from the front lens of the optic assembly. In a second embodiment, a lens array is disclosed having a first targeting optics which generates a half frame and a crosshair illumination pattern and a second targeting optics which generates a complementary half frame and crosshair illumination pattern. At the minimum value best focus position, the first and second illumination patterns combine to generate a full frame and single crosshair illumination pattern.

The device further includes a viewing assembly to further aid in aiming and positioning the portable data collection device with respect to a target object. A pivoting member is manually pivotable into an upright position in a line of vision of the operator. The pivoting member defines an aperture. The operator holds the device at a fixed distance with respect to his or her viewing eye and looks through the aperture to view the target object. The aperture is sized such that when an operator viewing eye is approximately 56 millimeters (mm.) from the pivoting member, a view seen through the aperture is substantially equivalent to the target area of the imaging assembly. Thus, the operator may advantageously use the aperture both for properly aiming the device at the target object and for moving the device closer to or further away from the target object so that the target object is large as possible but still is imaged within a perimeter of the target area. When the operator does not desire to use the viewing assembly, the pivoting member is folded down out of the operator's line of vision and out of harm's way.

The portable data collection device of the present invention includes pistol-grip shaped housing enclosing circuitry of the device. An angled snout extending from a grip portion of the housing includes an opening through which a portion of the illumination assembly and optic assembly extend. A finger operated trigger is provided on a target facing surface of the housing. The trigger is depressed by an operator to actuate the imaging assembly to read a bar code dataform in the target area. A push button actuator extends through an opening of the housing spaced apart from the trigger. The push button actuator is located so as to be depressible by the operator's thumb as the housing is cradled in the operator's hand. Depressing the push button actuator actuates the imaging assembly to capture an image of the target area. A slider extends through a slotted opening the in the housing and is operatively connected to the focusing module. By changing position of the slider, a thickness of an optic through which reflected light passes is altered and the best focusing position of the optic assembly is correspondingly changed. In an alternate embodiment of the focusing module, image analysis circuitry is provided which analyzes gray scale values corresponding to a captured image frame and automatically changes the thickness of the focusing module optic to achieve the image of a target area.

The aforementioned and other aspects of the present invention are described in more detail in the detailed description and accompanying drawings which follow.

BRIEF DESCRIPTION OF THE DRAWINGS

FIG. 1 perspective view of a portable data collection device of the present invention with a pivoting member of a viewing assembly in a folded down positions:

FIG. 1A is a back elevation view of a portion of a housing of the portable data collection device;

FIG. 2 is a perspective view of the portable data collection device with the viewing assembly pivoting member in an upright position;

FIG. 3 is a sectional view of a portion of a housing of the portable data collection device with the viewing assembly pivoting member in the folded down position;

FIG. 4 is a sectional view of a portion of the housing of the portable data collection device with the viewing assembly pivoting member in the upright position;

FIG. 11 is an exploded perspective view of an illumination assembly of the modular portion of the imaging assembly of the present invention;

FIG. 12 a perspective view of a lens array or front panel of the illumination assembly of FIG. 11;

FIG. 13 is an exploded perspective view of a targeting optics of the front panel of FIG. 12;

FIG. 20 is a perspective view of a lens array or front panel of the illumination assembly of FIG. 19;

FIG. 21 is an exploded perspective view of a targeting optics of the front panel of FIG. 20;

FIG. 22 is a front elevation view of the front panel of FIG. 20;

FIG. 27 is a representation of a crosshair illumination pattern generated by the illumination assembly of FIG. 11 superimposed on a target object;

FIG. 28 is a representation of a separation of crosshair illumination patterns of two targeting optics of the illumination assembly of FIG. 11 caused by imaging with the portable data collection device at a distance from a target object significantly different than a best focus position or distance of an optic assembly of the device;

FIG. 29 is a representation of an angular shift of crosshair illumination patterns of two targeting optics of the illumination assembly of FIG. 11 caused by imaging with the portable data collection device tilted such that the front panel is not substantially parallel to a surface of a target object;

FIG. 30 is a representation of a crosshair and half frame illumination pattern generated by a first targeting optics of the illumination assembly of FIG. 19;

FIG. 31 is a representation of a crosshair and half frame illumination pattern generated by a second targeting optics of the illumination assembly of FIG. 19;

FIG. 32 is a representation of a crosshair and full frame illumination pattern generated by the first and second targeting optics of the illumination assembly of FIG. 19;

FIG. 38 is a perspective view of a support fixture for the focusing assembly of the optic assembly of FIG. 10;

FIG. 39 is a sectional view of the focusing assembly support fixture of FIG. 38;

FIG. 40 is front elevation view of a movable wedge shaped optic of the focusing assembly of the optic assembly of FIG. 10;

FIG. 41 is top plan view of the movable wedge shaped optic of FIG. 40 as seen from the plane indicated by the line 41—41 in FIG. 40;

FIG. 42 is a schematic sectional view of an optic assembly of the modular portion of the imaging assembly of FIG. 8 including an alternate embodiment of a focusing assembly;

FIG. 42A is a side elevation view of a portion the focusing assembly of FIG. 42 as seen from a plane indicated by the line 42A—42A in FIG. 42;

DETAILED DESCRIPTION

Figure 5:
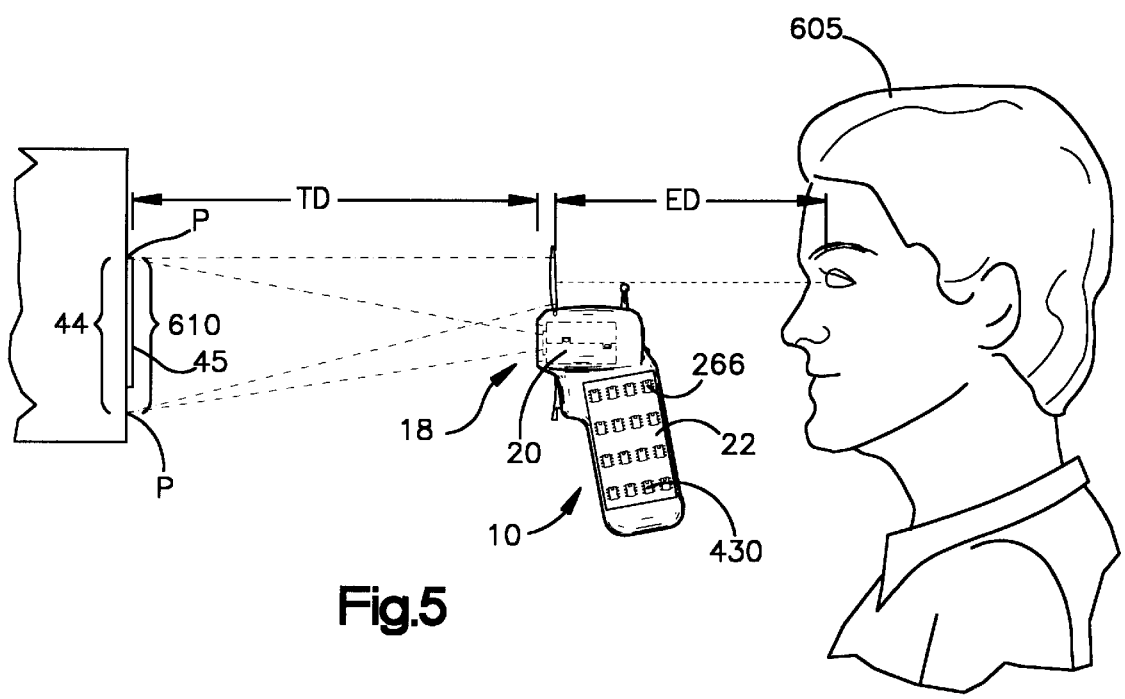
FIG. 5 is a view, partly in side elevation and partly in section, of the portable data collection device showing use of the viewing assembly to align the device with a target object.
Figure 6:
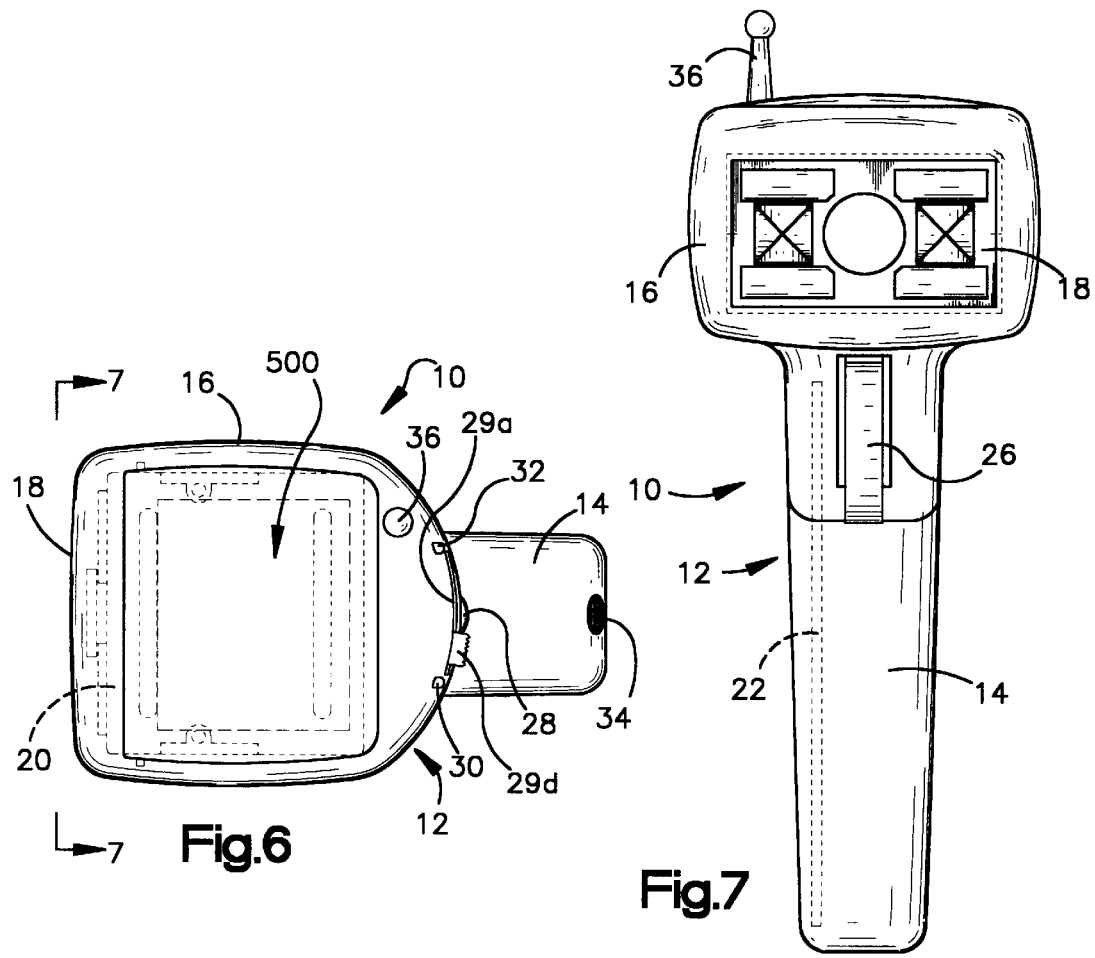
FIG. 6 is a top plan view of the portable data collection device.
Figure 7:
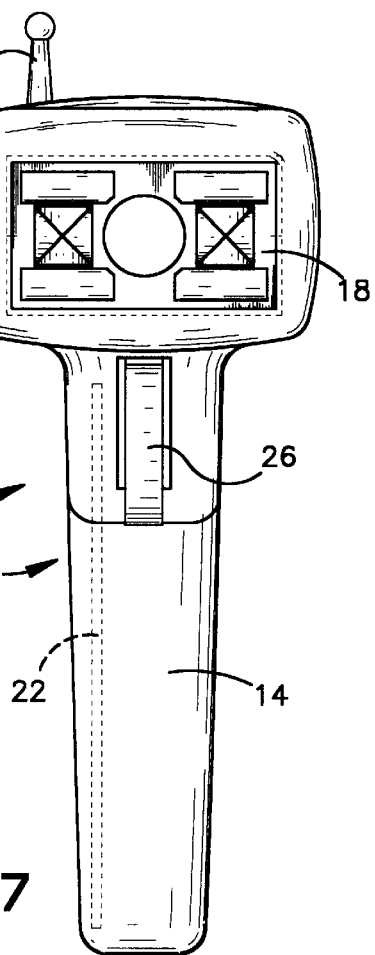
FIG. 7 is a front elevation view of the portable data collection device as seen from a plane indicated by the line 7—7 in FIG. 6.

Turning to the drawings, a portable data collection device in accordance with the present invention is shown at 10 in FIGS. 1–7. The data collection device 10 includes a housing 12 defining an interior region. The housing 12 includes a gripping portion 14 sized to be grasped in the hand of an operator and an angled snout 16 extending from the gripping portion. With specific reference to FIG. 7, the snout 16 includes an opening through which a portion of a two dimensional (2D) photosensor array imaging assembly 18 extends. The imaging assembly 18 includes a modular portion 20 and a control and decoder board 22 electrically coupled to the electronic circuitry in the modular portion. The control and decoder board 22 is supported within the gripping portion 14 of the housing 12. Also supported within the housing gripping portion 14 is a power source 24 such as a rechargeable battery for supplying operating power to the portable data collection device 10.

A dataform reading trigger switch or actuator 26 extends through an opening in the gripping portion 14. Also extending through an opening in the gripping portion 14 is an imaging push button trigger switch or actuator 28. The dataform reading trigger 26 is positioned to be depressed by an index finger of the operator while the gripping portion 14 of the housing 12 is held in the operator's hand. The imaging trigger 28 is positioned to be depressed by a thumb of an operator while the gripping portion 14 of the housing 12 is held in the operator's hand. Also extending through an opening in the housing 12 just above the imaging trigger 28 is a slider 29 moveable along a path of travel defined by a slotted opening 29a in the gripping portion 14. As will be discussed below, moving the slider 29 causes a best focus position or distance of an optic assembly 43 of the imaging assembly 18 to change thereby allowing the operator to change a focusing range of the dataform reader 10. The slider 29 is positioned on the housing snout 16 to permit operation by the operator's thumb. Moving the slider 29 to an end 29b (FIG. 1A) of the slotted opening 29a causes the optic assembly 43 to have a best focus distance at approximately 5.5 inches (140 mm.) in front of an outwardly facing surface 90 of a forwardmost lens of the optic assembly 43. On the other hand, moving the slider 29 to an opposite end 29c of the slotted opening 29a causes the optic assembly 43 to have a best focus distance at approximately 36 inches (915 mm.) in front of the outer surface 90 of the forwardmost lens of the optic assembly 43.

The gripping portion 14 also includes two small openings through which a distal portion of a red light emitting diode (LED) indicator 30 and a distal portion of a green LED indicator 32 extend. Finally, the housing 12 includes an opening exposing a portion of a microphone 34 mounted in the housing interior region and another opening through which a radio antenna 36 extends. The interior region of the housing 12 supports the imaging assembly 18 and other electronic circuitry to be described below.

Figure 8:
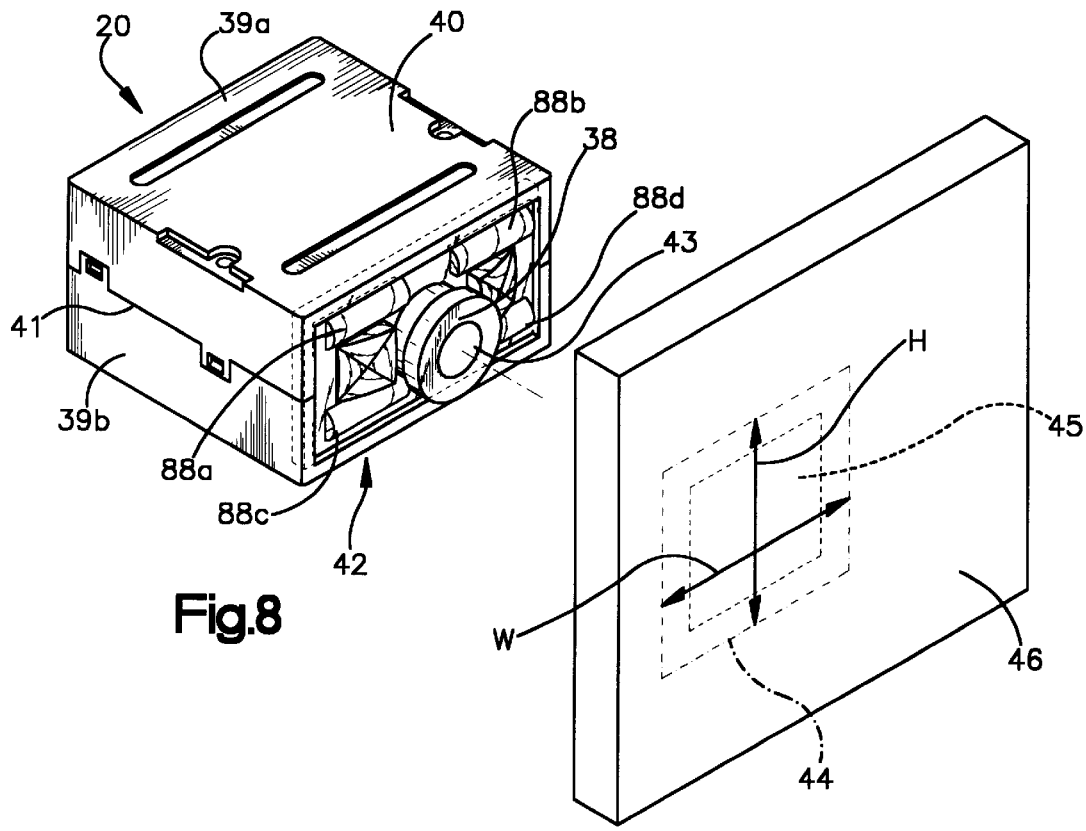
FIG. 8 is a perspective view of a modular portion of an imaging assembly of the portable data collection device of the present invention, the modular portion shown imaging a target dataform on an item.

Referring to FIG. 8, which shows a perspective view of the modular portion 20 of the imaging assembly 18, it can be seen that the modular portion includes a housing 40 which supports an illumination assembly 42 and a board camera assembly 38. The housing 40 includes an upper portion 393a and a lower portion 393b which advantageously are identically shaped and positioned symmetrically about a part line 41. The board camera assembly 38 includes the optic assembly 43 which focuses an image of a target area 44 onto a photosensor array 48. The target area 44 is defined by a field of view of the board camera assembly 38. The target area 44 will generally include a target object 45 such as a one or two dimensional bar code dataform or a matrix dataform to be decoded. The illumination assembly 42 includes four illumination optic portions 88a, 88b, 88c, 88d each of which projects an even intensity distribution of illumination across the target area 44.

Figure 9:
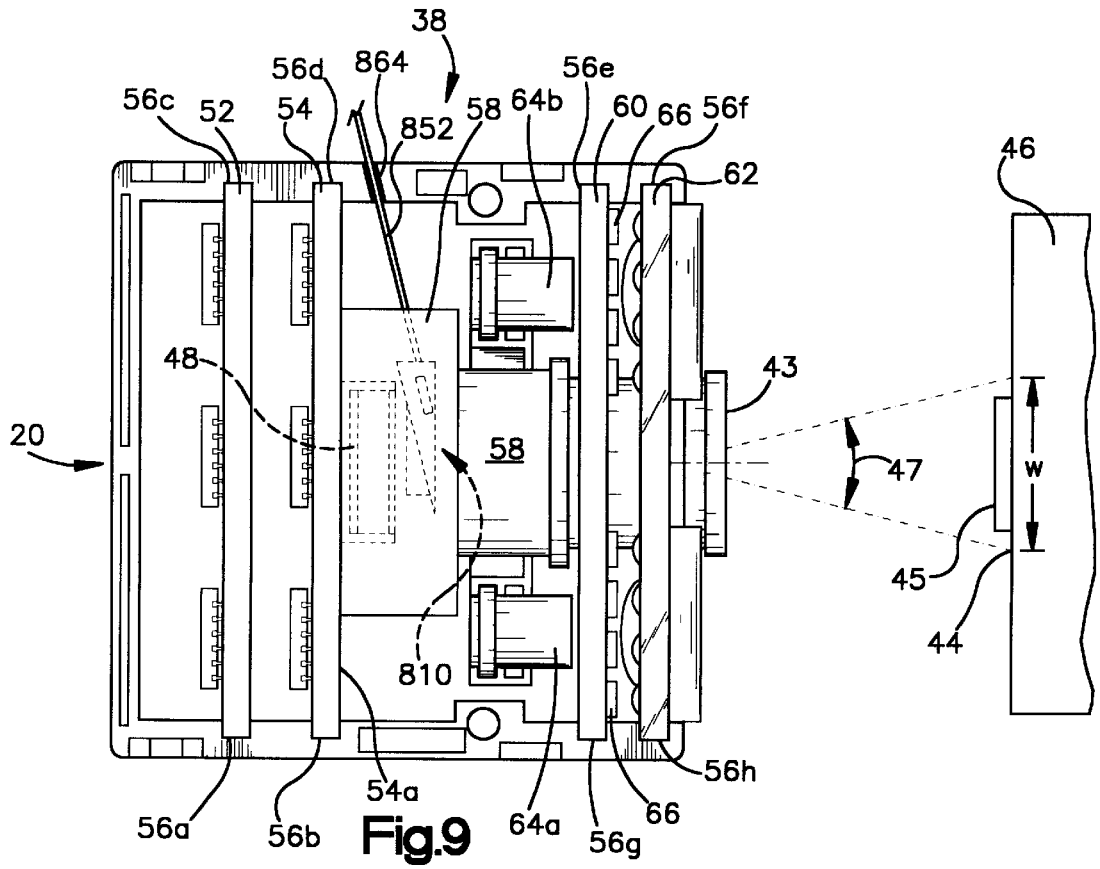
FIG. 9 is a view of the modular portion of the imaging assembly of FIG. 8 with an upper half of a housing of the modular portion removed.

FIG. 9 is a top view of the modular portion 20 with the upper portion 39a of the housing 40 removed. The board camera assembly 38 includes a rear printed circuit board 52 and a front printed circuit board 54, both of which are secured in the housing 40 in slots 56a, 56b, 56c, 56d. A two dimensional photosensor array 48 is positioned on a support 49 (FIG. 10) affixed to a front surface 54a of the front printed circuit board 54. The photosensor array 48 receives reflected illumination from the target area 44 focused through an optic assembly 43. The support 49 surrounds the photosensor array 48 and holds a thin piece of quartz 50 in spaced apart, parallel relationship with what photosensor array 48. The quartz piece 50 has a thickness of 0.6 mm. and is spaced 1.310 mm. from the photosensor array 48. The quartz piece 50 has an index of refraction of 1.5443.

A shroud 58 positions the optic assembly 43 with respect to the photosensor array 48 and shrouds ambient illumination from the array. The illumination assembly 42 includes a printed circuit board 60, a lens array 62 and two targeting LEDs 64a, 64b. The lens array 62 functions as the outer or front panel of the modular portion 20. The term "front panel" will be used interchangeably with the term "lens array" throughout. A plurality of exposure LEDs 66 are disposed on the front surface of the printed circuit board 60 to direct illumination through the front panel 62 towards the target area 44. The circuit board 60 and the front panel 62 are secured in slots 56e, 56f, 56g, 56h in the upper and lower housing portion 39a, 39b. Securing the board camera assembly 38 and the illumination assembly 42 in the same housing 40 assures that illumination is properly directed onto the target area 44.

Figure 10:
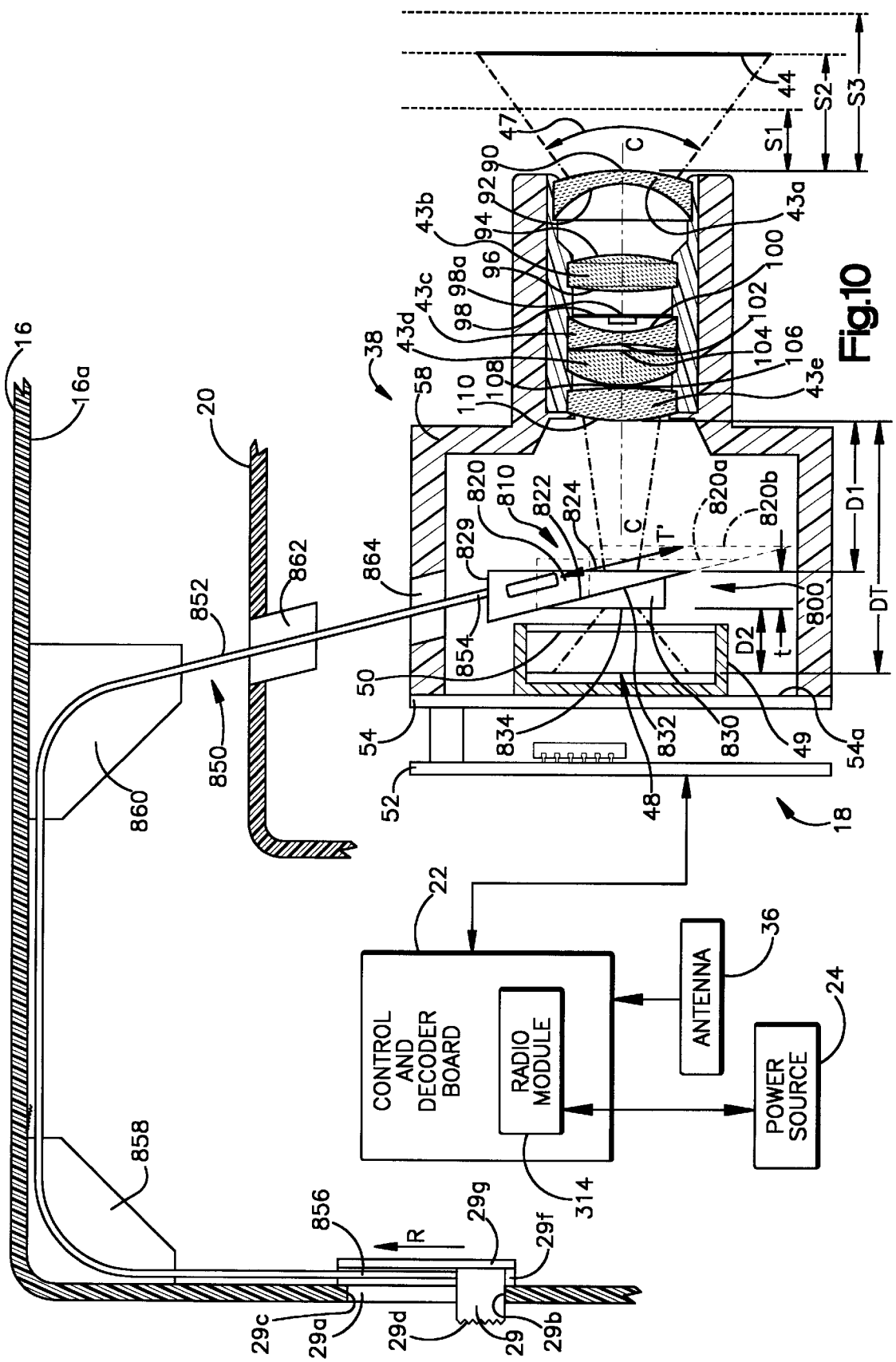
FIG. 10 is a schematic sectional view of an optic assembly of the modular portion of the imaging assembly of FIG. 8 including a focusing assembly.

FIG. 10 shows a cross section of the camera assembly 38 with the optic assembly 43 focusing an image of the target area 44 including an image of the target object 45 onto the photosensor array 48. The performance of the portable data collection device 10 is enhanced by the optic assembly 43 including a focusing assembly 800 which provides the board camera assembly 38 with an extended, variable working range. The focusing assembly 800 is operable to vary a best focus position or distance S2 (FIG. 10) of the optic assembly 43. The best focus position S2 is a distance from an outermost optic surface 90 of a forwardmost lens 43a of the optic assembly 43 to the target object 45 at which the best or clearest image of the target object is focused on the photosensor array 48. The sharpness of the focused image gradually degrades as the target object 45 is moved from the best focus position S2 towards a near field cut off distance S1. If the target object 45 is a dataform, moving the target object 45 closer than the near field cut off distance S1 would result in an image projected onto the photosensor array 48 that is undecodable. Similarly, the image sharpness gradually degrades as the target object 45 is moved from the best focus position S2 towards a far field cut off distance S3. Assuming that the target object 45 is a dataform, moving the target object 45 further away than the far field cut off distance S1 would result in an image projected onto the photosensor array 48 that is undecodable.

The focusing module 800 includes a focusing optic 810 comprising two wedge shaped lens 820, 830 which are congruent in shape and supported in a lens support fixture 840 (seen in FIGS. 38 and 39). As can best be seen in FIGS. 10, 39 and 41, the lens 820, 830, when viewed from above, define congruent triangles. The angles labeled "a" in the lens 820, 830 are both substantially 90 degree angles and the acute angle labeled "b" in lens 820 is substantially equal to the acute angle labeled "b" in lens 830. The lens 820, 830 are supported by the fixture 840 such that the flat, inclined surfaces 822, 832 of lens 820, 830 are parallel and adjacent. Further, outwardly facing flat surfaces 824, 834 are substantially parallel. The focusing optic 810 is positioned such that it is substantially perpendicular to a central ray c (FIG. 10) of reflected light from the target area 44 which passes through lens 43a, 43b, 43c, 43d, 43e of the optic assembly 43. The lens 820, 830 are preferably fabricated from type BK7 glass having a refractive index of 1.5168. Type BK7 glass is available from Schott Glass Technologies, Inc. of Duryea, Pa.

The focusing module 800 is configured such that an effective thickness t (FIG. 10) of the focusing optic 810 through which the reflected light passes may be changed by the operator of the portable data collection device 10 to vary the best focus position S2 of the optic assembly 43. Correspondingly, the near field cut off distance S1 and the far field cut off distance S2 will also be changed as follows:

$$DT = D1 + D2 + t$$
$$= 3.1209 \text{ mm.} + 4.4000 \text{ mm.} + 1.00 \text{ mm.}$$
$$= 8.5209 \text{ mm.}$$

The minimum value of S2 (5.5 in. or 140 mm.) will be referred to as MIN S2.

Suitable dimensions for the two lens 820, 830 comprising the focusing optic 810 are as follows:

| Lens | Description & Label | Dimension |
| --- | --- | --- |
| 820 | Height A (FIG. 41) | 10.00 mm. |
| 820 | Base B (FIG. 41) | 2.25 mm. |
| 820 | Width E (FIG. 40) | 4.00 mm. |
| 830 | Height C (FIG. 41) | 4.00 mm. |
| 830 | Base D (FIG. 41) | 0.90 mm. |
| 830 | Width E (FIG. 40) | 4.00 mm. |

The distance labeled D1 corresponds to a distance between an optic surface 110 of the rearwardmost lens 43e and the forward facing surface 824 of the lens 820. A suitable distance D1 is 3.1209 mm. The distance labeled D2 corresponds to a distance between the rearward facing surface 834 of the lens 830 and the photosensor array 48. A suitable distance D2 is 4.4000 mm. The total distance DT between the photosensor array 48 and the optic surface 110 of the rearwardmost lens 43e the sum of D1, D2 and focusing optic thickness t, $$DT = D1 + D2 + t$$
$$= 3.1209 \text{ mm.} + 4.4000 \text{ mm.} + 1.00 \text{ mm.}$$
$$= 8.5209 \text{ mm.}$$

Operationally, the thickness t of the focusing optic 810 is varied by moving or sliding the lens 820 with respect to the lens 820. As can best be seen in FIGS. 40 and 41, the moveable lens 820 includes a pair of projecting flanges 825, 826 extending from top and bottom surfaces 827, 828 of the lens 820. The projecting flanges 825, 827 slidingly engage respective slots 842, 844 of spaced apart horizontal plates 846, 848 of the support fixture 840. The slots 842, 844 function to guide the projecting flanges 825, 827 and, therefore, the moveable lens 820 along a path of travel labeled T in FIG. 39.

A drive means 850 is provided to move the moveable lens 820 along the path of travel T. The drive means 850 includes a flexible belt 852 having one end 854 attached to a base surface 829 of the lens 820. An opposite end 856 of the belt 852 is attached to the slider 29. A portion 29d of the slider 29 extends through the slotted opening 29a in an operator facing back side of the snout 14 of the housing 12. The slider 29 is slidably confined between a pair of parallel ledges 29e, 29f (which can be seen in dashed line in FIG. 1A and one of which can be seen in FIG. 10) which extend outwardly from the inner surface 16a of the housing snout 16. The ledges 26e, 29f have peripheral lips 29g to further confine the slider 29. As the slider portion 986 is moved along the slotted opening 988 in a direction labeled R in FIG. 10, the belt 852 moves in the same direction and the lens 820 correspondingly moves. As can be seen in FIG. 10, the belt 852 is supported by guides 858, 860 extending from an inner surface of the housing snout 16. The belt 852 extends through a guide 862 defining an opening in the modular housing 20 and another guide 864 defining an opening in the shroud 58. The belt 852 further extends through a guide 866 in a vertical side plate 868 of the fixture 840. The fixture includes the vertical side plate 868 and another vertical side plate 870 which function to maintain the proper spaced relation between the horizontal plates 846, 848. The fixture 840 is secured to the front side 54a of circuit board 54 by four screws 872 extending through openings in flanges 874 and through the circuit board 54. The flanges 874 extend from the horizontal plates 846, 848.

The belt 852 is flexible enough the conform to the curves defined by the guides 858, 860 but is stiff enough to move the moveable lens 820 along its path of travel T when the slider 29 is moved along the slotted opening 29a. When the slider 29 is moved, lens 820 moves along its path of travel T guided by the engagement of the projecting flanges 825, 827 and the slots 842, 844 of spaced apart horizontal plates 846, 848. As the moveable lens 820 moves the moveable optic contact surface 822 slides across the stationary optic contact surface 832 thereby varying the thickness t of focusing optic 810, that is, varying the total distance the reflected light from the target area 44 must traverse before reaching the photosensor array 48.

The stationary lens 830 can be thought of as a compensation lens because it causes the focusing optic 810 to have a shape of a plate of glass with two parallel faces oriented such that the faces are normal or perpendicular to the incident reflected light no matter what the position of the moveable lens 820. Different positions of the moveable lens 820 are shown in FIG. 10. In solid line, a position of the lens 820 at one end of its path of travel T is shown. This position corresponds to a minimum thickness t of the focusing optic 810. In the dashed line labeled 820a, an intermediate position of the lens 820 is shown corresponding to a medium thickness t of the focusing optic 810. Finally, in the dashed line label 820b, a position of the lens 820 at an opposite end of its path of travel T is shown. This position corresponds to a maximum thickness t of the focusing optic 810. When the slider 29 is in the position shown in FIG. 10, that is, abutting the end 29b of the opening 29a, the moveable lens 820 is at the position which results in a minimum thickness t of the focusing optic 810. As the slider 29 is moved to a position abutting the opposite end 29c of the opening 29a, the moveable lens 820 is at the position labeled 820b which results in a maximum thickness t of the focusing optic 810.

By using the two wedge shaped lens 820, 830 as shown, the resulatant focusing optic 810 is equivalent to a glass plate with parallel sides and variable thickness. Since the index of refraction of the focusing optic 810 (1.5168) is greater than the index of refraction of air, inserting the optic 810 between the innermost lens 43e of the optic assembly 43 and the photosensor array 48 will change the best focus distance S2. As the thickness of the focusing optic 810 increases, the best focus distance S2 also increases. Thus, imprinted on the housing snout 16 adjacent the end 29b of the opening 29a is the letter "N" indicating to the operator that moving the slider 29 toward the end 29b will cause the optic assembly 43 reduce its best focus distance S2. The opposite end 29c has a letter "F" imprinted near it to indicate that moving the slider toward the end 29c will increase the best focus distance S2. Since the focusing optic 810 is essentially a glass plate with parallel sides, the reflected light passing through the optic 810 is not subject to image shift or tilt.

When the focusing optic 810 has it minimum thickness t of 1.0 mm., the best focus position MIN S2 is at 140 mm.

(5.5 in.) from the outward facing optic surface 90 of the lens 43*a*. At the best focus position of 140 mm., the field of view or target area 44 of the optic assembly 43 is generally rectangular in shape and having dimensions of approximately 82 mm. 3.2 in.) long by 62 mm. (2.4 in.) high. At a distance of 8.5 inches from the front surface 90, the target area of the optic assembly 43 is approximately 127 mm. (5 inches) long by 95 mm. (3.75 inches) high. The optic assembly 43 is capable of decoding a bar code dataform with narrow width bars (e.g., a bar code dataform with a minimum bar width of 0.015 in. (0.381 mm.) at the near field distance S1).

The preferred optic assembly 43 includes the five lens 43*a*, 43*b*, 43*c*, 43*d*, 43*e* and a metal disk 98 having a pin hole aperture 98*a* which, as shown, includes eleven optic surfaces labeled 90–110. In the preferred embodiment the rear most optic surface 110 of lens 43*e* is positioned 10.2 mm. to the front of the photosensor array 48, that is, the distance labeled DT in FIG. 10 is 10.2 mm.

The optic prescriptions for each of the optic surfaces are as follows:

| Optic Surface | Radius of Surface Curvature | Diameter | Shape |
|---|---|---|---|
| 90 | R = 13.52 mm. | D = 8.8 mm. | convex |
| 92 | R = 5.3 mm. | D = 8.8 mm. | concave |
| 94 | R = 12.47 mm. | D = 7 mm. | convex |
| 96 | R = 19.9 mm. | D = 7 mm. | convex |
| 98 | Pinhole diameter 0.81 mm. | | |
| 100 | R = 6.76 mm. | D = 7 mm. | concave |
| 102 | R = 12.47 mm. | D = 7 mm. | concave |
| 104 | R = 158.52 mm. | D = 7 mm. | convex |
| 106 | R = 6.76 mm. | D = 7 mm. | convex |
| 108 | R = 28.08 mm. | D = 7 mm. | convex |
| 110 | R = 11.26 mm. | D = 7 mm. | convex |

The distance between successive optical surfaces 90–110 is as follows:

| Optic Surface | Distance |
|---|---|
| 90–92 | 0.77 mm. |
| 92–94 | 4.632 mm. |
| 94–96 | 2.32 mm. |
| 96–98 | 1.798 mm. |
| 98–100 | 0.805 mm. |
| 100–102 | 0.77 mm. |
| 102–104 | 0.327 mm. |
| 104–106 | 2.34 mm. |
| 106–108 | 0.178 mm. |
| 108–110 | 2.07 mm. |

Such an optic assembly is available from Marshall Electronics, Inc. of Culver City, Calif.

An alternate optic assembly which includes a compact aspheric plastic doublette design can be found in U.S. patent application Ser. No. 08/494,435, filed Jun. 26, 1995, entitled "Extended Working Range Dataform Reader", now issued as U.S. Pat. No. 5,811,784 on Sep. 22, 1998. U.S. Pat. No. 5,811,784 is incorporated in its entirety herein by reference.

Because the desired working range and field of view of the portable data collection device 10 dictates that the optic assembly 43 have a large F# (F#5.6 or greater), the illumination assembly 42 must provide adequate illumination of the target area 44 during the exposure period so that enough reflected light is absorbed by the photosensor array 48 to generate a suitably bright image. However, the exposure period is normally limited to 0.01 seconds or less to minimize the smear effect of an operator's hand jittering during a dataform reading session. Therefore, the illumination assembly 42 must provide adequate illumination to accommodate the large F# and short exposure time.

Proper exposure of the photosensor array 48 requires an object field illumination of 0.3 lux assuming an exposure period of 0.03 seconds and an F#1.2. To determine the proper object field illumination for a 0.01 second exposure period and an F#13, the following formula is used:

$$\frac{(\text{Illumination intensity})(\text{Exposure period})}{(F\#)^2} = \text{Constant}$$

Therefore, the minimum required object field illumination for this invention is 106 lux at the far field cut off distance S3.

Referring to FIG. 11, which is an exploded perspective view of the illumination assembly 42, the printed circuit board assembly 60 includes a plurality of surface mount exposure illumination LEDs 66. An acrylic or polycarbonate lens array 62 is positioned between the printed circuit board assembly 60 and the target area 44 for directing the illumination from the exposure LEDs 66 towards the target area 44. Preferably, the lens array 62 is a unitary structure fabricated from the material PMMA (polymethyl methacrylate). However, it should be appreciated that it could be fabricated from other suitable materials such as glass or a combination of glass optics supported in a molded panel or other suitable arrangement known to those skilled in the art. The printed circuit board assembly 60 includes printed conductors and a power lead 112 operative for supplying power to the illumination LEDs 66. A suitable surface mount illumination LED is produced by the Mark-Tech Corporation of Latham, N.Y., as Part No. MTSM735K-UR or MTSM745KA-UR. Each illumination LED 66 provides illuminosity of 285 milli candela (mcd) over an angular illumination field of about 68 degrees. The small footprint of each illumination LED 66 enables four LEDs to be placed in a row measuring less than 14 mm. The printed circuit board assembly 60 includes four banks of four illumination LEDs 66 totaling sixteen illumination LEDs providing 4560 mcd of uniform illumination over the target area 44.

The lens array 62 includes four illumination optic portions 88*a*, 88*b*, 88*c*, 88*d* each of which are aligned with a corresponding bank of illumination LEDs 66. The illumination optic portions 88*a*, 88*b*, 88*c*, 88*d* direct a 68 degree angular illumination field from each illumination LED 66 into a uniform field having an angular field of view which substantially corresponds to the angular field of view of the optic assembly 43 which defines the target area 44 (shown in FIGS. 8 and 9).

Figure 16:
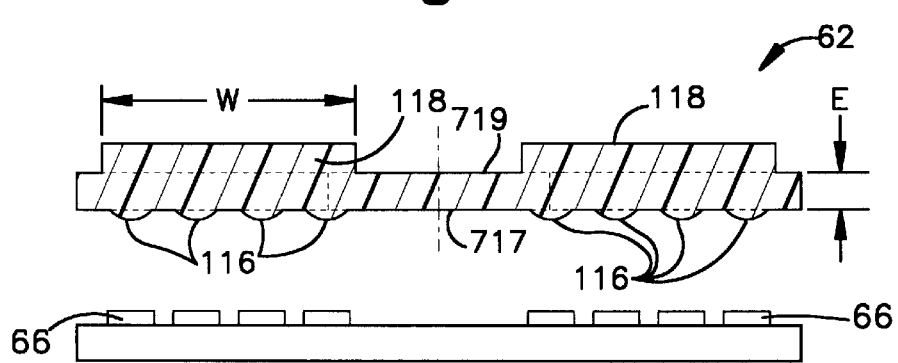
FIG. 16 is a sectional view of the front panel of FIG. 12 as seen from a plane indicated the line 16—16 in FIG. 14.
Figure 18:
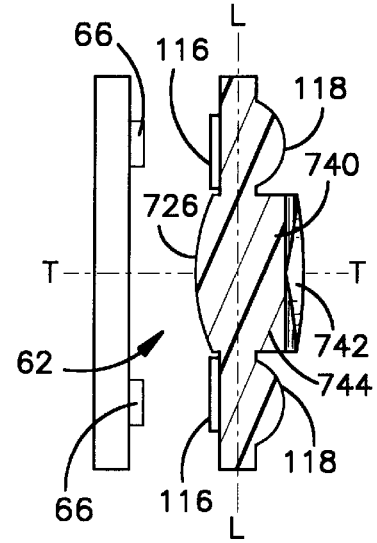
FIG. 18 is a sectional view of the front panel of FIG. 12 as seen from a plane indicated by the line 18—18 in FIG. 14.

Referring to FIGS. 16 and 18, which show a horizontal cross section (FIG. 16) and a vertical cross section (FIG. 18) through the illumination optic portions 88*a*, 88*b*, 88*c*, 88*d*, it can be seen that each optic portion includes four vertically oriented cylindrical entry surfaces 116, one positioned in front of each LED 66 and a horizontally oriented cylindrical exit surface 118 positioned in front of each bank of LEDs 66. The vertically oriented cylindrical entry surfaces 116 define the horizontal field of illumination and the horizontally oriented cylinders 118 define the vertical field of illumination. This arrangement provides an even illumination intensity distribution across the target area 44. The 4560 mcd of illumination provided by the illumination LEDs 66 will provide an illumination intensity in excess of 106 lux at a distance of 8.5 inches from the outermost optic surface 90 of the optic assembly lens 43a.

Figure 34B:
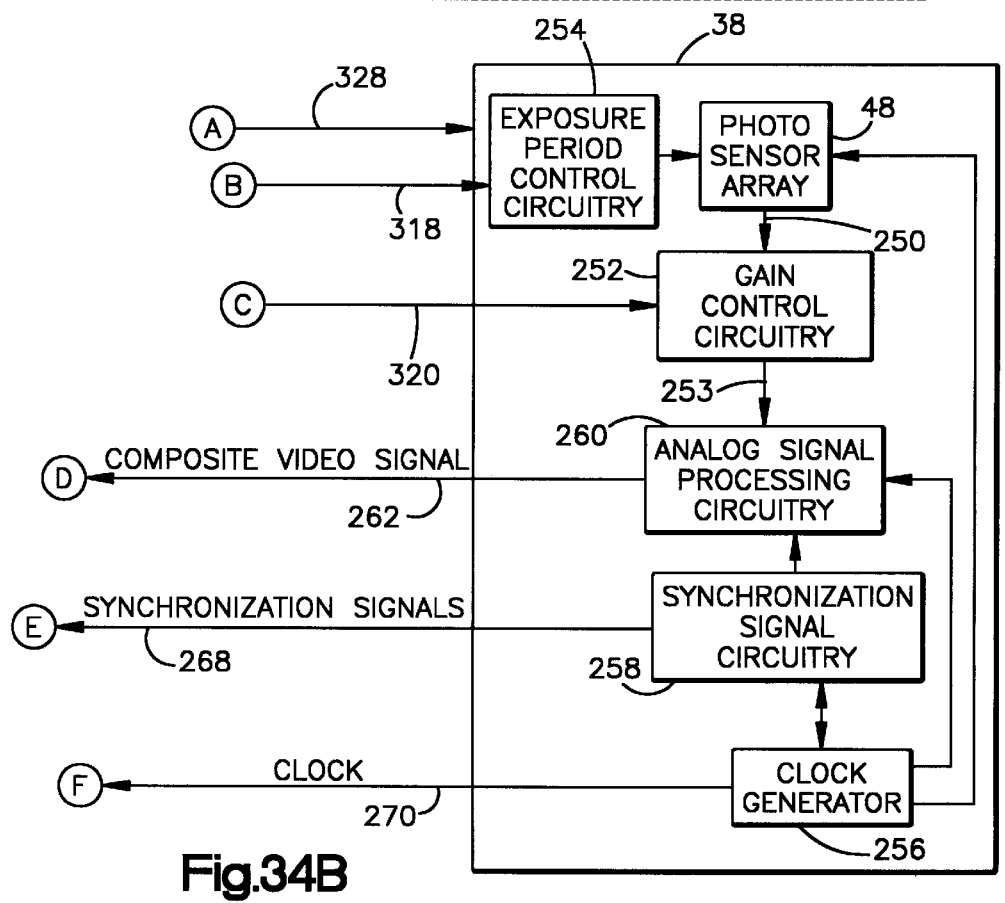
FIG. 34B is a second portion of a block diagram of selected circuitry of the portable data collection device of the present invention, the second portion matching the first portion shown in FIG. 34A.
Figure 35:
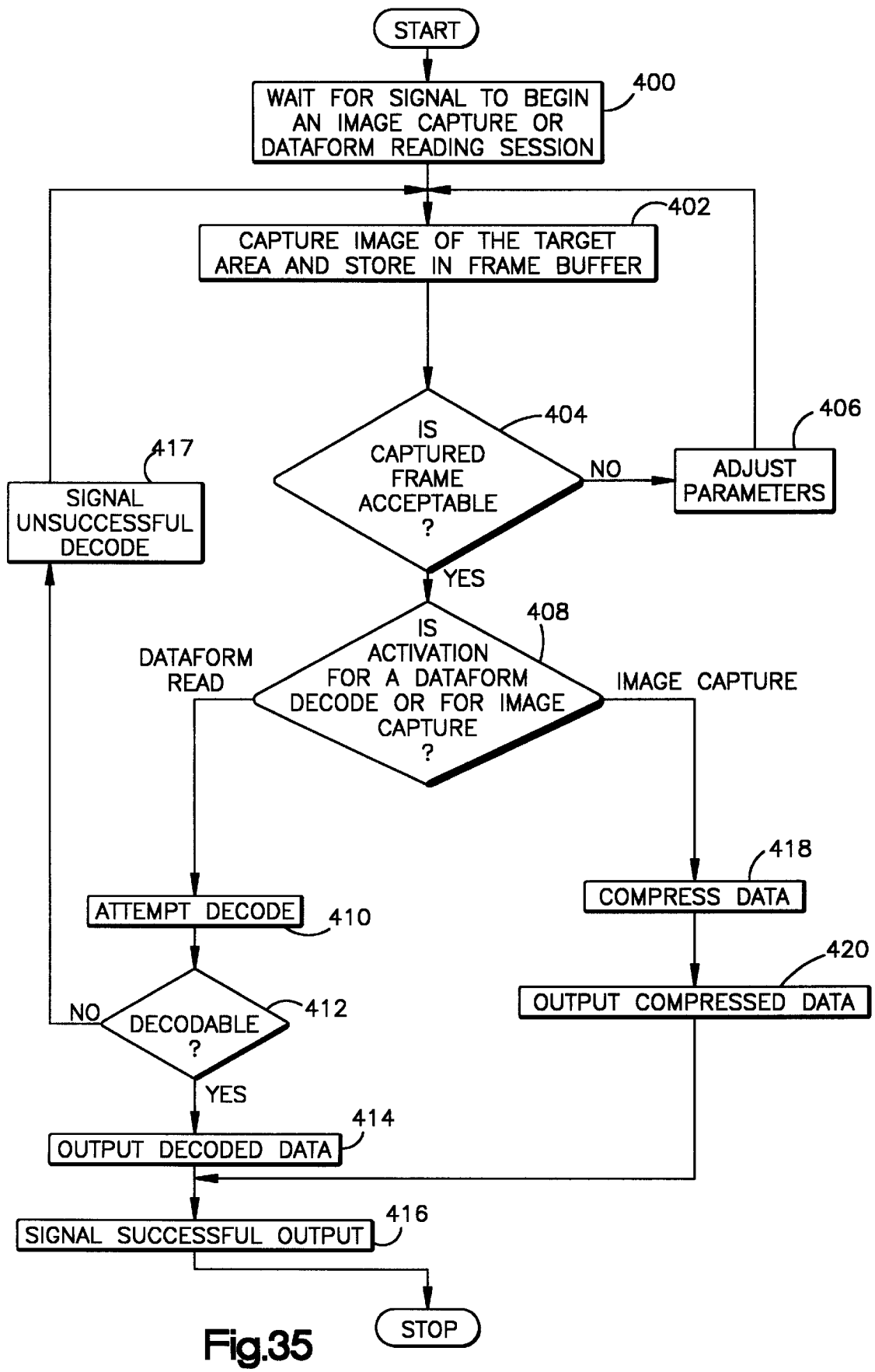
FIG. 35 is a flow chart setting forth one operating embodiment of the portable data collection device of the present invention to decode a bar code dataform and capture an image of a target area.
Figure 36:
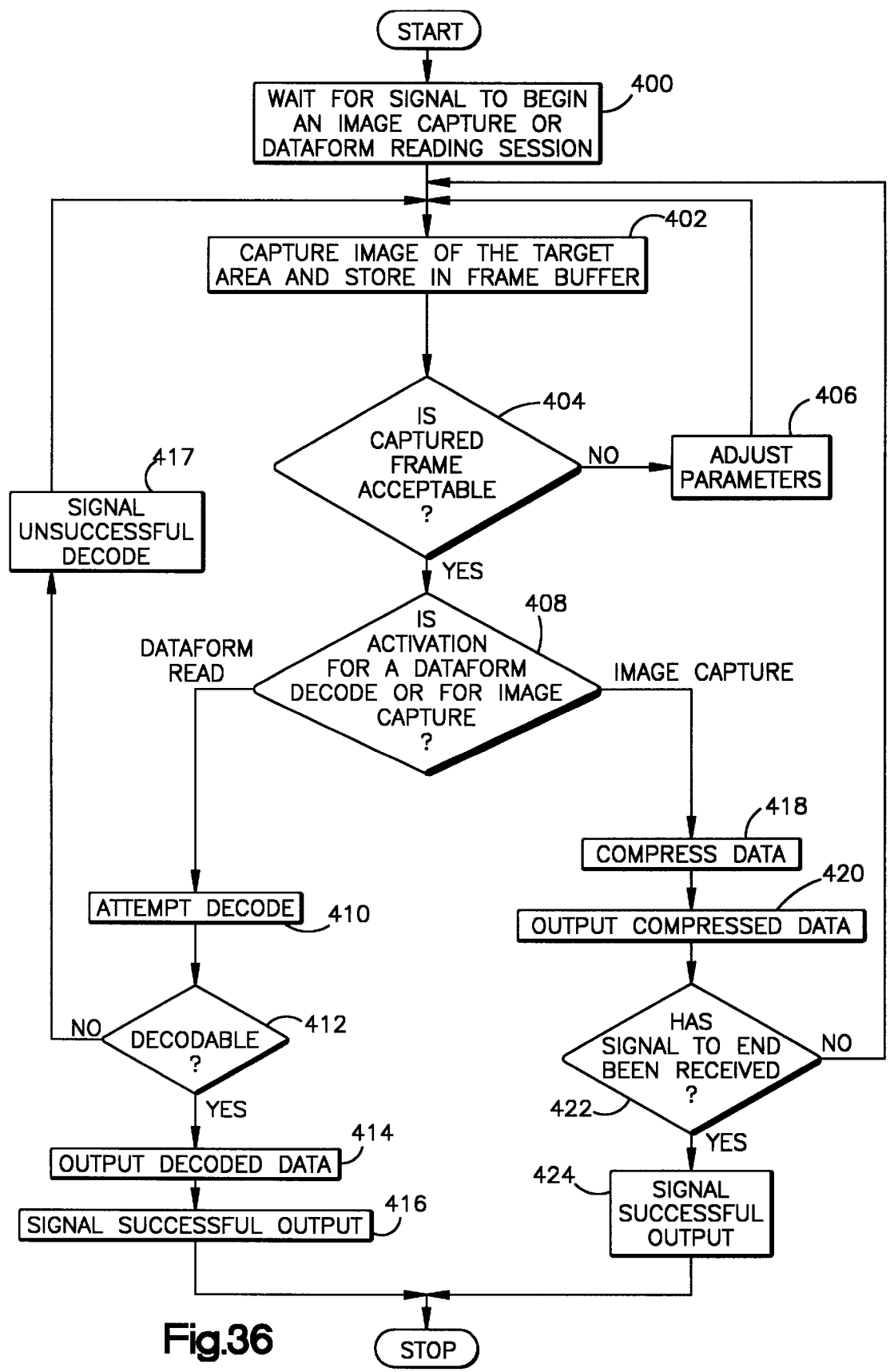
FIG. 36 is a flow chart setting forth a second operating embodiment of the portable da collection device of the present invention to decode a bar code dataform and capture an image of a target area.

A central opening 67 in the printed circuit board assembly 60 provides an opening for the shroud 58 to extend through. The vertically oriented entry surfaces 716 have a radius of curvature of 2.50 mm. and a height I (FIG. 35) of 4.00 mm while the horizontally oriented exit surfaces 718 have a radius of curvature of 3.00 mm. and a width J (FIG. 36) of 13.75 mm. Referring to FIGS. 34–36, suitable dimensions for the lens array 702 are as follows:

| Label | Description | Dimension |
|-------|-------------|-----------|
| A | Height of lens array 62 | 21.75 mm. |
| B | Width of lens array 62 | 39.55 mm. |
| C | Diameter of center opening 67 of lens array 62 | 12.00 mm. |
| D | Height between middle of vertical entry surfaces 116 | 14.13 mm. |
| E | Thickness of lens array 62 | 1.95 mm. |

Referring again to FIG. 11, the illumination assembly 42 also includes a targeting arrangement or assembly 64 to aid in aiming the device 10 at the target object 45. The targeting assembly includes the targeting LED illuminators 64a, 64b, which, when energized, project illumination through apertures 68, 70 in the printed circuit board 60 and into first and second targeting optics 72, 74 respectively of the lens array 62. The first and second targeting optics 72, 74 are mirror images of each other and are identical in configuration. Each targeting optic generates a crosshair pattern of illumination CR1, CR2 (seen in FIG. 27) and, as will be discussed below, if the target object 45 is at a proper distance for imaging, i.e., at the minimum best focus position MIN S2 of the optic assembly 43, the crosshairs CR1, CR2 will coincide or overlap producing a single rectangular crossing or crosshair pattern of illumination CR (FIGS. 11 and 27). The rectangular illumination pattern CR will have a height h (18 mm.) and a width w (18 mm.) (FIG. 11). Of course, the rectangular illumination-pattern CR will not be a perfect intersecting line crosshair but rather will be characterized by an illumination intensity distribution or pattern having some visible "thickness" t (FIG. 11) but will nonetheless be suitable for aiming the device 10.

Figure 17:
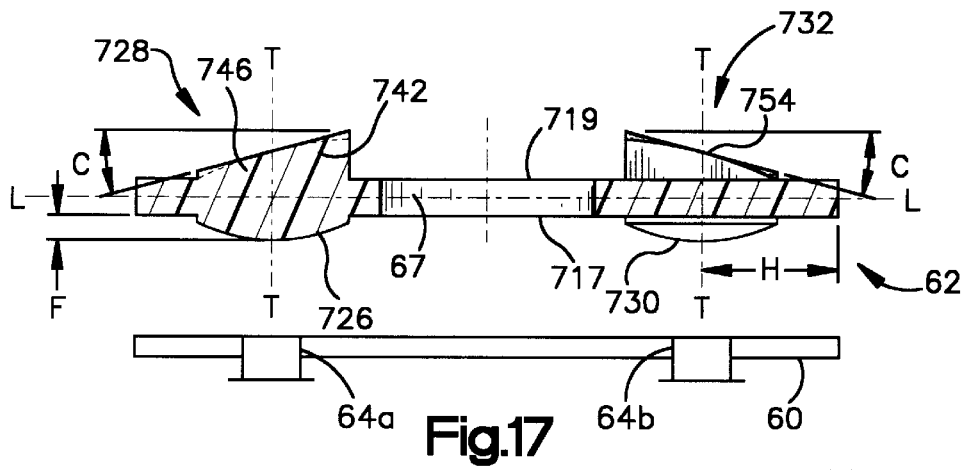
FIG. 17 is a sectional view of the front panel of FIG. 12 as seen from a plane indicated by the, line 17—17 in FIG. 14.

The first and second targeting optics 72, 74, which are identical in configuration, are shown in cross section in FIGS. 17 and 18. The first targeting optics 72 comprises a lens with an aspherical light entry optic surface 726 and a segmented cylindrical light exit optic surface 728. The second targeting optics 74 comprises a lens with an aspherical light entry optic surface 730, similar to the aspherical light entry optic surface 726, and a segmented cylindrical light exit optic surface 732, similar to the segmented cylindrical light exit optic surface 728.

Figure 14:
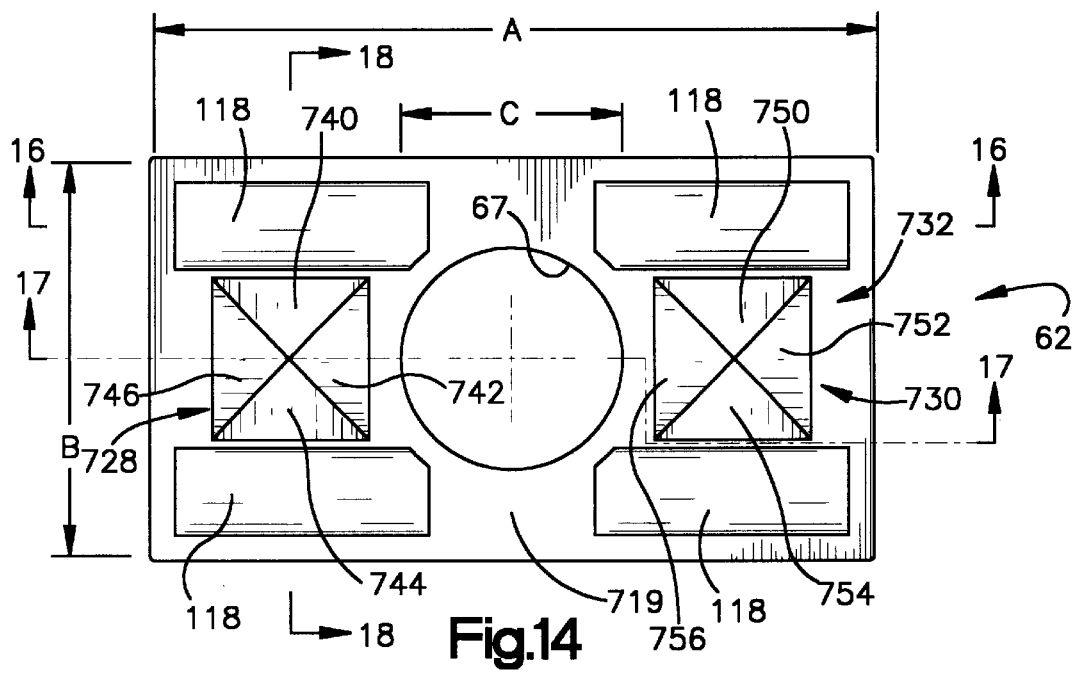
FIG. 14 is a front elevation view of the front panel of FIG. 12.
Figure 15:
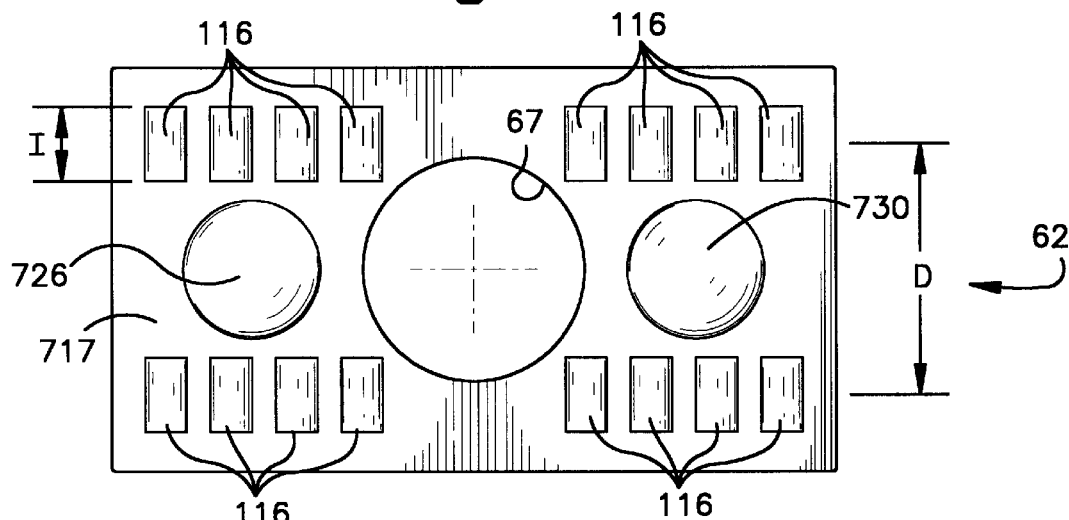
FIG. 15 is a back elevation view of the front panel of FIG. 12.

The aspherical entry surfaces 726, 730 each have a diameter of 8 mm., a radius of curvature of 2.890 mm. and a conic constant of −2.534. The segmented cylindrical light exit surfaces 728, 732 each have an 8.0 mm. by 8.0 mm. square shaped outer perimeter. The segmented cylindrical surface 728 is comprised of four triangular shaped sections 740, 742, 744, 746 (FIG. 14) while the segmented cylindrical surface 732 is divided into four triangular shaped sections 750, 752, 754, 756, wherein the optic surfaces of sections 740 and 750 are identical, the optic surfaces of sections 742 and 752 are identical, the optic surfaces of sections 744 and 754 are identical and the optic surfaces of sections 746 and 756 are identical.

Upper and lower triangular sections 740, 744 comprise vertically oriented cylindrical light exit optic surfaces. Left and right triangular sections 742, 746 comprise horizontally oriented cylindrical light exit optic surfaces. Similarly, upper and lower triangular sections 750, 754 comprise vertically oriented cylindrical light exit optic surfaces, while left and right triangular sections 752, 756 comprise horizontally oriented cylindrical light exit optic surfaces. The vertically oriented cylindrical optic surfaces 740, 744, 750, 754 have a radius of curvature of 25.00 mm. Similarly, the horizontally oriented cylindrical optic surfaces have a radius of curvature of 25.00 mm.

As can best be seen in FIG. 17, the horizontally and vertically oriented cylindrical optic surfaces 742, 746, 740, 744 are tipped at an angle c with respect to a longitudinal axis L-L though the lens array 62 and, therefore, is also tipped at an angle c with respect to the target area 44. The tip angle c of the horizontally oriented cylindrical optic surfaces 742, 746 shifts the horizontal position of the illumination rectangle or targeting crosshair CR1 (seen in FIG. 28) generated by the first targeting optics 72 such that it is horizontally centered in the target area 44 while the tip angle c of the vertically oriented cylindrical optic surfaces 740, 744 shifts the vertical position of the targeting crosshair CR1 generated by the first targeting optics 72 such that it is vertically centered in the target area 44. A suitable tip angle of c is 9.85 degrees.

Similarly, as can also be seen in FIG. 17, the horizontally and vertically oriented cylindrical optic surfaces 752, 756, 750, 754 are also tipped at an angle c which is preferably 9.85 degrees with respect to a longitudinal axis L-L though the lens array 62. Note that the direction of tilt of the segmented cylindrical light exit surfaces 728, 732 are the same in magnitude but opposite in a direction of tilt, that is, the light exit surface 728 of the first targeting optics 72 slants downwardly to the left toward the front side 719 in FIG. 17, while the light exit surface 732 of the second targeting optics 74 slants downwardly to the right toward the front side 719 in FIG. 17. Also note that the two horizontally oriented light exit optic surfaces 718 which would be seen in FIG. 17 (and in FIG. 25 discussed below with respect to an alternate embodiment of the illumination assembly 42) have been removed for clarity of the drawing. It should also be noted that FIG. 13 which shows the segmented cylindrical light exit surface 732 as being comprised of four individual exploded "pieces" is only a representation to provide additional clarity as to the shape and tilt of the four light exiting surfaces 750, 752, 754, 756. The lens array 62 is fabricated as a single piece and the targeting optics 72, 74 and illumination optics 116, 118 are formed in the single piece. The lens optics are not fabricated by "piecing" together individual optics. The same is true with respect to the optic "pieces" represented in FIG. 21 of the alternate embodiment of the illumination assembly 42 shown in FIGS. 19–26 to be discussed below.

Additional suitable dimensions, labeled on FIG. 17, for the aspheric light entry surfaces 726, 730, the segmented cylindrical light exit surfaces 728, 732 of the lens array 62 are as follows:

| Label | Description | Dimension |
|---|---|---|
| F | Maximum extension of aspheric light exit surfaces 726, 730 from back side 717 of lens array 62 | 1.75 mm. |
| G | Distance between maximum extension of aspheric light exit surfaces 726, 730 and center of respective segmented light exit surfaces 728, 732 along centerlines T-T | 5.25 mm. |
| H | Distance between centerlines T-T and outer edge of lens array 62 | 7.80 mm. |

As noted above, the minimum best focus distance MIN S2 is 140 mm. (5.5 inches). If the device 10 is oriented such that the lens array 72 is substantially parallel to a surface of the target object 45 (a dataform to be imaged and decoded) and positioned at the minimum best focus distance MIN S2 from the target object 45, then the targeting crosshairs CR1 and CR2 will coincide and generate the single targeting crosshair CR as shown in FIGS. 11 and 27 having an approximate height h of 18 mm. (0.7 in.) and an approximate width w of 18 mm. (0.7 in.) which corresponds to the target area 44 height of 62 mm. (2.4 in.) and a width of 82 mm. (3.2 in.) at the minimum best focus position MIN S2 of 140 mm. (5.5 inches) in front of the optic surface 90.

If the device 10 is moved away from the minimum best focus distance MIN S2 with respect to the target object 45, the targeting crosshairs CR1 and CR2 will separate horizontally as shown in FIG. 28 thereby informing the operator that the distance of the device 10 from the target object 45 is not correct for best imaging or imaging and decoding. The operator will adjust the focusing optic 810 using the slider 29 appropriately to compensate for the distance between the target object 35 and the optic assembly 43. For example, if the distance between the target object 45 and the optic assembly 43 is more than 36 inches and, if the distance for some reason cannot be reduces (e.g., because the target object 45 is above the operator's outstretched arm and hand) the operator would use his or her thumb to move the slider 29 to the "F" marked end 29c of the slotted opening 29a so as to increase the best focus distance S2 from its minimum value (140 mm. or 5.5 in.) to its maximum value (915 mm. or 36.0 in.). Of course, if the operator can move the device 10 with respect to the target object 45, the preferred mode of operation would be to have the slider 29 at the "N" marked end 29b of the slotted opening 29a and adjust the device's distance from the target object 45 such that the CR1 and CR2 crosshairs overlap. At that point, the target object distance will be 140 mm. (5.5 in.) and corresponding to the optic assembly 43 minimum best focus distance MIN S2 140 mm. (5.5 in.).

Finally, if the lens array 702 is not substantially parallel to a surface of the target object 45, that is, the device 10 is tilted forward or backward from a position where a front surface 719 (FIGS. 12 and 17) of the lens array or front panel 72 is parallel to the target object surface, the vertical portions of the illumination patterns of CR1 and CR2 will be angularly shifted or displaced as shown in FIG. 49, the greater the angle of tilt of the device 10, the greater will be the angular shifting of the vertical portions of the illumination patterns CR1; CR2.

Referring again to FIGS. 1–4, the portable data collection device 10 also includes a viewing assembly 600. The viewing assembly 600 includes a pivoting member 602 which pivots between a folded down position (FIGS. 1 and 3) and an upright position (FIGS. 2 and 4). The pivoting member 602 includes a rectangular opening 604. The opening 604 is approximately 32 mm. in the horizontal direction, labeled 606 in FIG. 2, and is approximately 24 mm. in the vertical direction, labeled 608 in FIG. 2. The horizontal and vertical dimensions 606, 608 of the opening 604 are chosen such that an angle of divergence or field of view of an operator 605 looking through the opening 604 at a distance of approximately 56 mm., labeled ED in FIG. 5, is substantially the same as the field of view of the imaging assembly 18. The ratio of the horizontal dimension 606 to the vertical dimension 609 is chosen to correspond to the ratio of the horizontal dimension to the vertical dimension of the matrix of photosensors comprising the 2D photosensor array 48.

As can be seen in FIG. 5, when in an upright position, the pivoting member 602 is in a line of vision of the operator 605. When the opening 604 is position approximately 56 mm. from the operator's eye, a viewing area 610 through the aperture 604 substantially corresponds to the target area 44 of the imaging assembly 18.

The pivoting member 602, when in the folded down position, is received in a well or recessed area 608 defined by an upper surface of the housing snout 16. In the folded down position, an upper surface 612 (FIG. 3) of the pivoting member 602 is substantially flush with the snout upper surface. The snout upper surface 610 includes a recessed portion 614 (FIGS. 1 and 2) sized to permit an operator's finger tip to slip under a front lip 616 of the pivoting member 602 to permit the member to be popped up to the upright position from the folded down position. As can best be seen in FIGS. 3 and 4, the pivoting member front lip 616 member 602 fits under a slightly extending upper edge 617 of the snout upper surface to hold the pivoting member with a slight interference fit in the folded down position.

The pivoting member 602 pivots on a pair of cylindrical portions 618 which extend from sides of the pivoting member near its bottom edge. The cylindrical portions 618 rotatably fit within corresponding cylindrical recesses in the snout 16. Turning to FIGS. 3 and 4, an arcuate biasing spring 620 positioned in a recessed portion 622 of the snout 16. The recessed portion 622 is shaped to confine the spring 620 with edge portions of the snout defining the recessed portion. The spring 620 has a humped middle portion which biases the pivoting member 602 to either the upright position or the folded down position.

In the preferred embodiment of the portable data collection device of the present invention, the photosensor array 48 is part of the board camera assembly 38 commercially available from such vendors as Sharp or Sony of Japan. Referring to FIGS. 17A and 17B, the camera assembly, when activated, generates a composite video signal 262. The board camera assembly 38 also includes a clock generator 256, synchronization signal circuitry 258 and analog signal processing circuitry 260 for reading illumination intensity values out of each photosensor of the photosensor array 48 and generating the composite video signal 262.

The intensity of light incident on individual pixels or photosensors of the photosensor array 48 varies somewhat uniformly from very bright (whitest areas of the image) to very dark (darkest areas of the image). The preferred 2D photosensor array 48 comprises an interlaced 752 by 582 matrix array of photodiode photosensors or image pixels (for a total of 437,664 pixels). The clock generator 256 coupled to a crystal oscillator and generates asynchronous clocking signals to read out charges accumulating on individual photosensors over an exposure period. The charges on the photosensors are read out through CCD elements adjacent the photosensor array photosensors. The charges are converted to a voltage signal 250 wherein temporal portions of the voltage signal represent the changes accumulated on each photosensor. One CCD element is provided for reading out the charges on two photosensors thus two read outs of the photosensor array comprise one full image frame, the frame being comprised of two interlaced fields.

The camera assembly 38 generates the composite analog video signal 262 (FIG. 17A) corresponding to consecutive fields of the image incident on the photosensor array 48. The video signal 262 is termed "composite" because it includes synchronization signals generated by the synchronization signal circuitry 258 which correlate portions of the video signal to particular photosensors, interspersed among image signal portions wherein the signal magnitude represents charges on individual photosensors read out from a given row of the photosensor array 48.

The board camera assembly 38 also includes gain control circuitry 252 for controlling amplification of the image signal 253 and exposure period control circuitry 254 for controlling a duration of an exposure period of the pixels. Both the exposure period control circuitry 254 and the gain control circuitry 252 are controlled by fuzzy logic exposure parameter control circuitry discussed with reference to FIG. 34A.

The synchronization signals 268 generated by synchronization signal circuitry 258, the clock signal 270, generated by the clock generator 256, and the composite video signal 253 are output to signal processing circuitry 264 on the control and decoder board 22. Because the signal processing circuitry is configured to receive a composite video signal, it should be appreciated that selection of the board camera assembly 38 and its accompanying components for generating the composite video signal are not critical to the present invention.

Under the control of a microprocessor 266 mounted on the control and decoder board 22, the video signal 262 is input to the signal processing circuitry 264 along with clocking signals 268 and synchronization signals 270. The signal processing circuitry 264 includes synchronization extractor circuitry which receives the clocking signals 268 and the synchronization signals 270 and generates signals which are coupled to analog to digital converter circuitry (A/D converter circuitry) 272 causing the A/D converter circuitry to periodically digitize the video signal 262. The A/D converter circuitry 272 includes an A/D converter generating an 8 bit value representing the illumination incident on a pixel of the array.

Direct memory access (DMA) control circuitry 275 receives the synchronization signals 270 and clock signals 268 and generates address signals 276a coupled to the frame buffer memory 274 to indicate a storage location for each value generated by the A/D converter circuitry 272.

Data signals 276 representing the values generated by the A/D converter circuitry 272 are coupled to the frame buffer memory 274. Control and selection circuitry 284 mounted on the control and decoder board 22 and coupled to the frame buffer memory 274 receives successive image frames temporarily stored in the frame buffer memory 274. Also coupled to the control and selection circuitry 284 are the dataform read trigger circuit 26a which, in turn, is coupled to the dataform reading trigger 26 and an image capture trigger circuit 28a which, in turn, is coupled to the imaging trigger 28.

When an operator institutes a dataform reading session (dataform reading mode) by depressing the dataform reading trigger 26, the dataform read trigger circuit 26a sends a signal to the control and selection circuitry 284 causing the control and selection circuitry to couple a captured frame from the frame buffer memory 274 to image processing and decoder circuitry 290.

The image processing and decoding circuitry 290 includes a decoder 292 for decoding 1D and 2D dataforms in the target area 44. The image processing and decoder circuitry 290 operates on the stored frame of image data to extract dataform cell data (determine the black or white value of each cell of the dataform) and decode the cell data. Cell extraction is done in accordance with U.S. patent application Ser. No. 08/543,122 entitled, "Sub Pixel Dataform Reader With Dynamic Noise Margins", filed Oct. 13, 1995, now issued as U.S. Pat. No. 5,979,763 on Nov. 9, 1999 and assigned to the assignee of the present invention. The contents of application Ser. No. 08/543,122 are hereby incorporated by reference. Decoding of the cell data is accomplished by known decoding methods for each particular dataform format.

Also coupled to the control and selection circuitry 284 is image compression circuitry 294 and serial output circuitry 296. The control and selection circuitry 284 routes data 298 representing a decoded dataform data directly from the decoding circuitry 292 to the serial output circuitry 296. The decoded dataform data 298 is not compressed prior to output to the serial output circuitry 296. There is a possibility of error in the compression and subsequent decompression process and losing even a portion of a decoded dataform data may result in adverse consequences such as subsequent errors in updating inventory, determining the status or tracking an item, etc. Thus, the decoded dataform data 298 is not compressed.

When an operator institutes an imaging session (imaging mode) by depressing the imaging trigger 28, the image capture trigger circuit 28a sends a signal to the control and selection circuitry 284 causing the selection circuitry to couple a captured frame from the frame buffer memory 274 to image compression circuitry 294 to be compressed before being output to the serial output circuitry 296 or directly to the serial output circuitry 296 without being compressed.

Generally, the control and selection circuitry 284 will be programmed to route the data representing a captured image frame to the image compression circuitry 294 because the occurrence of one or more errors in the data representing an image is normally not a significant problem. That is, an image of an item in the target area 44 will still be recognizable and useful to supervisory personnel viewing the image reconstructed from the captured image frame data even if there is some slight distortion of the image. After compression of the image data by the image compression circuitry 294, compressed image data 300 is routed to the serial output circuitry 296. If, however, a high resolution image is needed, the control and selection circuitry 284 may be appropriately programmed to route the data representing the captured frame directly to the serial output circuitry 296.

The image compression circuitry 294 utilizes an image compression algorithm to reduce the size of a set of digital image data. One such algorithm is the 2D wavelet transform compression algorithm as described in "A 64 Kb/s Video Code Using the 2D Wavelet Transform" by A. S. Lewis and G. Knowles, published in IEEE Computer Society Press, Order No. 2202. The HARC Wavelet Transform System utilizing such technology is available from Houston Advance Research Center in Houston, Tex. and is capable of compressing photographic data with an image compression ratio of up to 400:1.

Because the portable data collection device 10 is adapted for use in remote on-site locations for reading a dataform identifying a particular item or capturing an image of an item, it is desirable to enable the imaging assembly 18 to also capture a verbal message from the operator. The control and decoder board 22 also includes a voice capture module 304 for capturing and digitizing an operator's verbal message and voice compression circuitry 306 for compressing the captured verbal message. The voice capture module 304 is coupled to the microphone 34 and is operable by the control and selection circuitry 284 to capture and digitize audio input. The voice compression circuitry 306 compresses a digitized voice signal. Data 308 representing the compressed digitized voice signal is coupled to the serial output circuitry 296.

For a predetermined period of time after either the dataform reading trigger 36 is depressed to initiate a dataform reading session (dataform reading mode) or the imaging trigger 28 is depressed to initiate a image capture session (imaging mode), the control and selection circuitry 284 monitors the image capture trigger switch 28. If the operator depresses the trigger 28 during the predetermined period, the voice capture module 304 and voice compression circuitry 306 are activated for verbal input. As long as the operator keeps the trigger depressed, the voice capture module 304 and voice compression circuitry 306 will remain activated so that the operator can speak into the microphone 34 and provide information concerning an item whose image was captured or whose dataform was read which will be transmitted and/or stored with the corresponding image or decoded dataform. Normally, the voice capture module 304 will be used subsequent to an imaging session where the operator wants to communicate to supervisory personnel reviewing the captured image some additional information concerning the imaged item such as the item's location, a short description of the problem with the item, etc. The voice compression circuitry 306 utilizes one of a number voice compression algorithms well known to those skilled in the art.

Decoded dataform data 298, compressed image data 300 and compressed digitized voice data 308 are routed to the serial output circuitry 296 which assembles output data 310 for serial output through a serial output port 312. In portable data collection device 10 of the present embodiment the serial output port 312 is coupled to an input port of a radio module 314 mounted on the control and decoder board 22 (shown schematically in FIG. 5). The radio module 314 modulates and transmits the output data 310 to a remote device (not shown) where the transmitted data is demodulated. The demodulated output data may be used to update inventory, and/or accounting records, update production control expediting or product tracking files, permit supervisory corrective action to remove/repair damaged items, etc.

The control and decoder board 22 further includes exposure parameters control circuitry 316 which outputs control signals 318, 320 to the exposure period control circuitry 254 and the gain control circuitry 252 of the camera assembly 38 and a signal 322 embodying an appropriate set of reference voltages for operating the A/D converter 272. The exposure parameters control circuitry 316 includes fuzzy logic circuitry 324 which analyzes captured frames of data accessed from the frame buffer memory 274. The fuzzy logic circuitry 324 analyzes a captured frame to determines if the current exposure period of the 2D photosensor array 48, the current amplification of the video signal 250 by the gain control circuitry 252 and the reference voltages used by the A/D converter circuitry 272 are resulting in an "acceptable" captured image frame. If not, the control signal 318 is changed to adjust the exposure period of the 2D photosensor array 48 and/or the control signal 320 is changed to adjust the amplification of the video signal 250 and/or the signal 322 is changed to adjust the operation of the A/D converter circuitry 272. After the adjustment, another captured frame is analyzed by the fuzzy logic circuitry 324 and, if necessary, further adjustments are made in an iterative fashion until the camera assembly 32 produces an "acceptable" captured image. A suitable exposure parameter control circuit including fuzzy logic control circuitry is disclosed in U.S. Pat. No. 5,702,059, previously referenced.

Figure 34A:
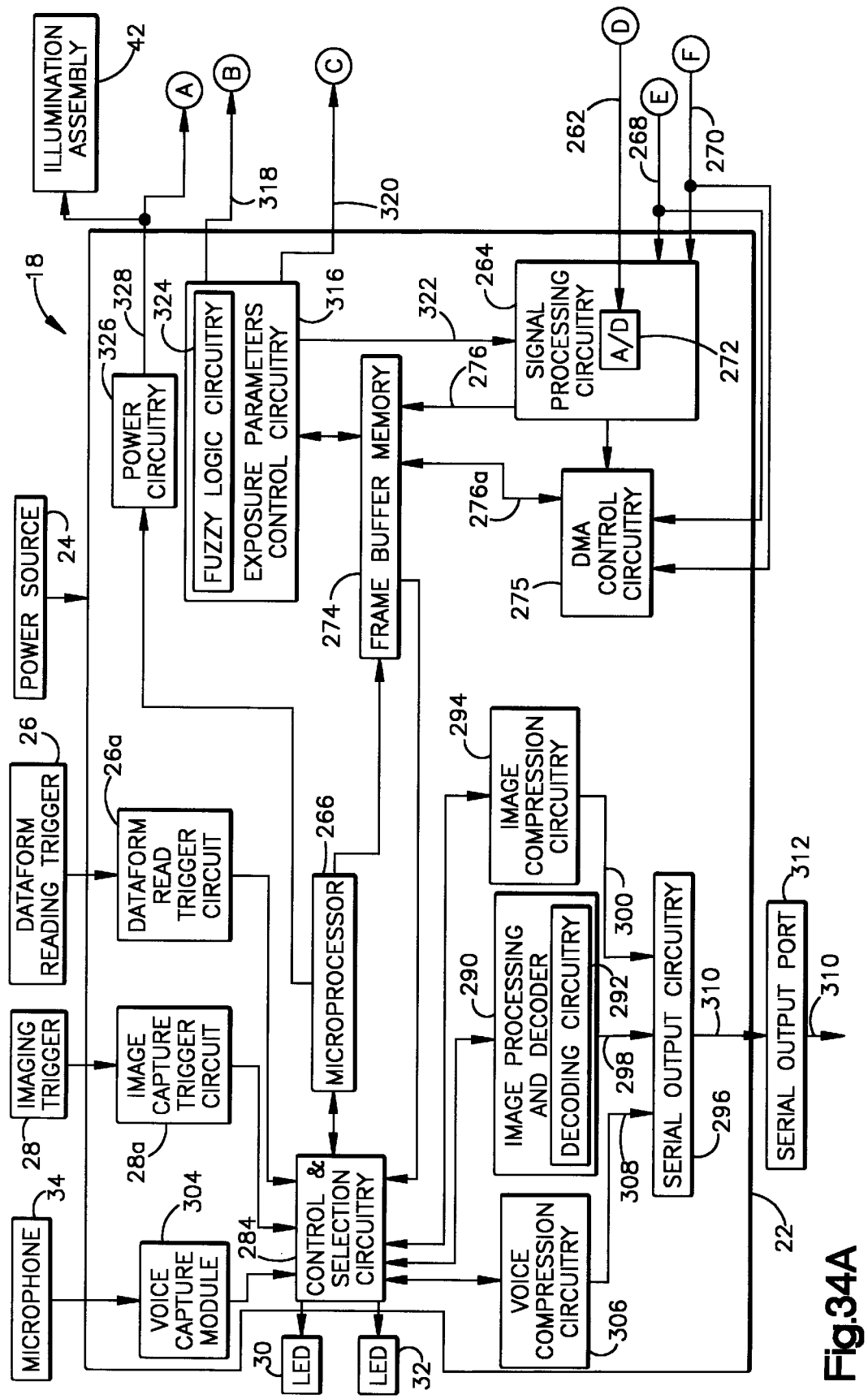
FIG. 34A is one portion of a block diagram of selected circuitry of the portable data collection device of the present invention.

As can be seen in FIGS. 10 and 34A, the power source 24 is coupled to the control and decoder board 22 to provide operating power to the microprocessor 266 and other circuitry mounted on the board and the radio module 314. Power circuitry 326 under the control of the microprocessor 266 is coupled through a lead 328 to the illumination assembly 42 and the camera assembly 38 to supply power to these components of the imaging assembly 18.

Figure 37:
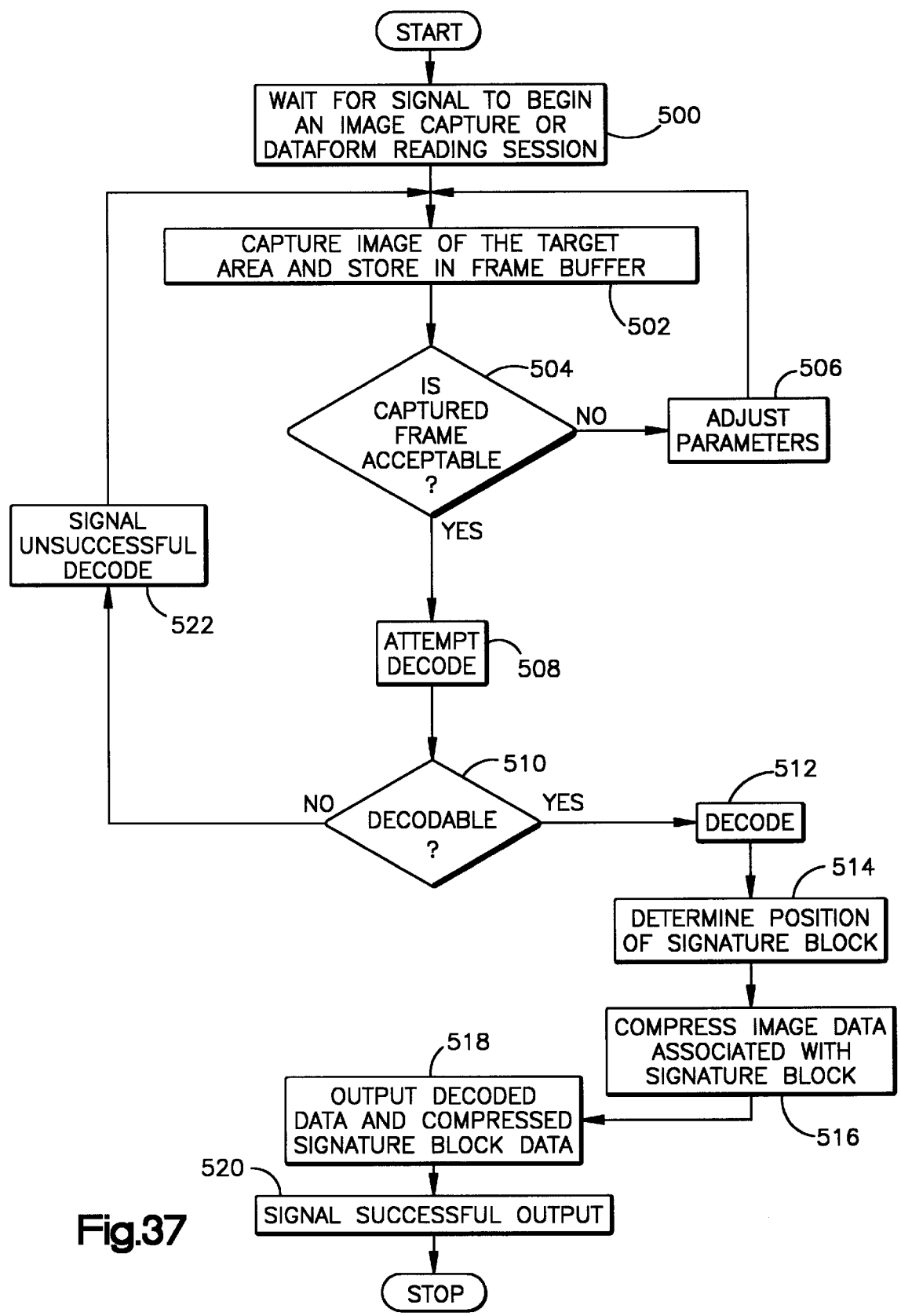
FIG. 37 is a flowchart setting forth a third operating embodiment of the portable data collection device of the present invention wherein a captured image frame includes a dataform and a signature block as shown in FIG. 16 and in which decoded dataform data and a portion of the capture image are output.

The flow chart shown in FIG. 35 illustrates the operation of the imaging assembly 18 in the dataform decoding mode and a first operating embodiment of the imaging mode. In the first operating embodiment of the imaging mode, a single frame of the image in the target area 44 is captured, compressed and output when the operator depressed the imaging trigger 28. The flow chart shown in FIG. 36 illustrates the operation of the imaging assembly 18 in the dataform decoding mode and a second operating embodiment of the imaging mode. In the second operating embodiment of the imaging mode, successive frames of the image in the target area 44 are captured, compressed and output as long as the operator has the imaging trigger 28 depressed. The flowchart in FIG. 37 illustrates a third operating embodiment in which the imaging assembly is actuated in the dataform reading mode and to decode a dataform within the image area and to capture the digital image dataform selected image area such as a signature box. The imaging system 18 determines a position of the dataform in the target area and then determines the position of the signature box. The digital image data corresponding to the portion of the image area including the signature box is output in either compressed or noncompressed form through the serial output port 312.

The imaging mode is advantageously employed when the operator using the portable data collection device 10 notices the item 46 is damaged, out of place, incomplete, etc. The imaging mode of the imaging assembly 18 is used to capture an image of tile item 46 and, using the radio module 314, transmit the captured image to a remote device accessible by supervisory personnel so that the problem may be ascertained by supervisory personnel and appropriate corrective action taken, e.g., deletion of item from inventory records, issuance of order to remove item from storage location and return to production facility or vendor for rework/repair, moving item to proper location, filing insurance claim, etc.

Turning to the first operating embodiment of the imaging mode shown in FIG. 35, at 400 the imaging assembly 18 waits for a signal representing either actuation of the imaging trigger 28 or the dataform reading trigger 26 to commence either an image capture session or a dataform reading session. The signal may be generated by the image capture trigger circuit 28a, the dataform reading trigger circuit 26a or by a signal generated by customer specific application software. At 402, upon receiving an appropriate signal, the imaging assembly 18 is activated and a frame of image data captured and stored in the frame buffer memory 274.

At 404, the fuzzy logic circuitry 324 determines if the captured image frame is acceptable, that is, the image is within predetermined acceptable ranges for brightness and the magnitude of charges on the photosensors of the 2D photosensor array 48. If the fuzzy logic circuitry 324 determines the captured frame is not acceptable, one or more of the operating parameters of the camera assembly 38 and the A/D converter circuitry 272 are modified as shown at step 406. The loop represented by steps 402, 404, 406 are repeated until the captured frame is determined to be acceptable.

At step 408, if the control and selection circuitry 284 determines that the activation signal is from the dataform reading trigger 26 requiring a dataform decode, the captured frame is coupled to the image processing and decoder circuitry 290 for attempted decoded of the dataform represented in the captured frame. At step 410, the decoding circuitry 292 attempts to decode the dataform represented in the captured frame. At step 412, a determination is made if the decoding was successful. At step 414, if the decoding was successful, the extracted decoded data is output to the serial output circuitry 296 and at step 416, the green LED indicator 32 is energized for a predetermined time to signal the operator that the dataform 45 in the target area 44 has been successfully read. Subsequently, the imaging assembly 18 is turned off.

If at step 412, the decoding was not successful, the selection circuitry at energizes the red LED indicator 30 for a predetermined time to signal to the operator that the decoding was unsuccessful and that he or she should continue to point the device 10 at the dataform 45 in the target area 44. The process returns to step 402 where another image frame is capture and the remaining steps are repeated.

If at step 408, the control and selection circuitry 284 determines that the activation signal is from the imaging trigger 28, the captured frame is routed to image compression circuitry 294 to compress the data in the captured frame, shown at step 418. At step 420, the compressed image data is output to the serial output circuitry 296 and the green LED indicator 32 is energized to signal the operator that the image in the target area 44 has been successfully captured.

Referring to FIG. 36, in a second operating embodiment of the imaging mode, successive frames of an image of the target area 44 are captured for as long as the operator maintains the imaging trigger 28 depressed. This operating embodiment would be advantageous in situations where the item 46 which the operator wishes to image because of some defect, damage, etc., is very large compared to the area of the target area 44. Therefore, capturing a single image frame and transmitting a signal corresponding to the captured frame to a remote device or supervisory review may not provide supervisory personnel with an image covering a large enough portion of the item 46 to ascertain the problem and determine appropriate corrective action. By capturing successive frames during the period that the operator keeps the imaging trigger 28 depressed, the operator may move the portable data collection device 10 with respect to the item 46 to provide a video image of the complete item (or an image of as much of the item as necessary to provide for identification of the item and the item's problem).

For this embodiment, the process remains generally the same as the embodiment described in connection with FIG. 35. However, after the output of compressed data to the serial output circuitry 296 at step 420, the control and selection circuitry 284, at step 422, checks to see if a signal has been received from the image capture trigger circuitry 28a indicating that the operator has released the imaging trigger 28. If such a signal from the image capture trigger circuitry 28a has been received, then at 424, the control and selection circuitry 284 energizes the green LED indicator 32 for a predetermined time period to signal the operator that the image in the target area 44 has been successfully captured. Subsequently, the imaging assembly 18 is turned off.

If no signal is received from the image capture trigger circuitry 28a indicating that the operator has released the imaging trigger 28, then the process loops back to step 402 and successive image frames are captured, compressed and output to the serial output circuitry 296 until such time as the control and selection circuitry 284 received the signal from the image capture trigger circuitry 28a indicating that the imaging trigger 28 has been released.

As can best be seen in FIGS. 10 and 34, the imaging assembly 18 includes the camera assembly 38 which is electrically coupled to the control and decoder board 22. The control and decoder board 22 includes the microprocessor 266 and associated circuitry. The circuitry of the imaging assembly 18 may by embodied in software resident in one or more RAM or ROM memory chips 430 (FIG. 5) mounted on the control and decoder board 22 and operated by the microprocessor 266. Alternately, the circuitry of the imaging assembly 18 may comprise separate application-specific integrated circuitry (ASIC) mounted on the control and decoder board 22.

Figure 33:
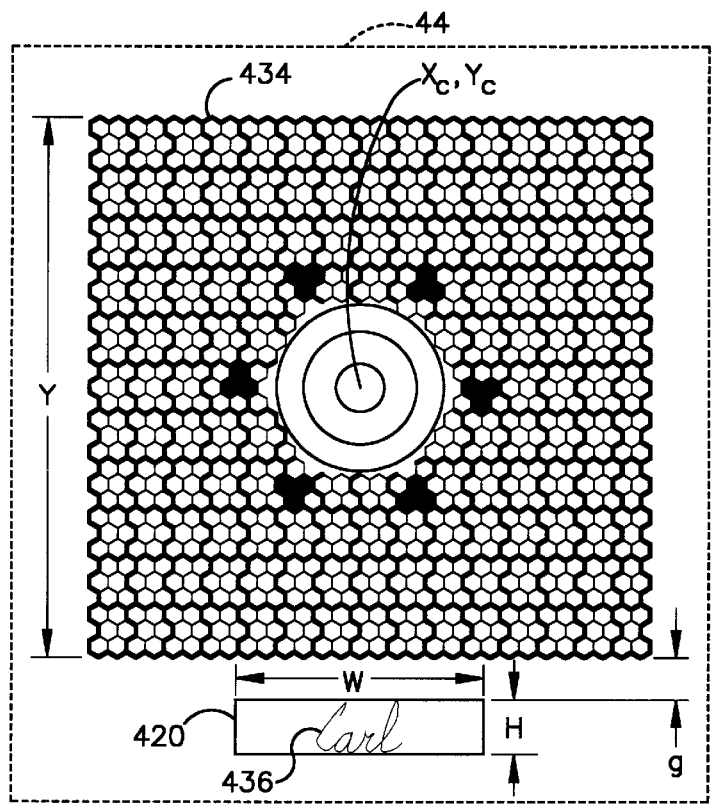
FIG. 33 is a representation of a matrix dataform and an associated signature block.

In the third operating embodiment of the portable data collection device 10 of the present invention, the dataform decoding mode is actuated to capture, compress and output an image contained within the boundary of an image area associated with a dataform. For example, the desired image area may be a signature block positioned a predetermined distance from a dataform. In FIG. 33, a signature block 432 is associated with a 2D dataform 434 known as MaxiCode (MaxiCode™ is a symbology standard of United Parcel Service). The signature block 420 is positioned at a predetermined location with respect to the dataform 434.

The dataform 434 is imprinted on a label affixed to a package to be delivered to a recipient. When the package is delivered, the recipient signs his or her signature 436 within a perimeter of the signature block 420. To document delivery of the package, the portable data collection device imaging assembly 18 is actuated with the dataform reading trigger 28 to image and decode the dataform 434. However, in addition to decoding the dataform 434, it would be desirable to store a portion of the captured image corresponding to the image within the signature block 320 to prove the recipient's acknowledgement of receipt of the package.

In the third operating embodiment, the imaging assembly 18 will capture an image of the target area 44 including both the dataform 434 and the signature block 420. The output data sent to the serial output circuitry 296 will include the decoded dataform and a compressed digital image of the image within the signature block 420, i.e., the signature 436.

FIG. 37 is a flowchart summarizing this third operating embodiment. At step 500, the imaging assembly 18 waits for the start of a dataform read session which is typically initiated by the operator pulling the dataform reading trigger switch 26. After imaging the target area 44, at step 502, a frame of an image of the target area 44 is captured and a digital representation is stored in the frame buffer memory 274. The fuzzy logic control circuitry 324 determines if the captured image frame is acceptable for decoding at step 504. If the frame is not acceptable, parameters are adjusted at step 506.

If the captured image frame is acceptable for decoding at step 508, the decoding circuitry 292 attempts to decode cell data values associated with illumination intensity data values stored in the frame buffer memory 274. At step 510, if the cell data values are decodeable, then, at step 512, decode of the dataform 434 occurs. The signature block 420 is located at a predetermined position with respect to the dataform 434, that is, the location, size and/or orientation of the signature block 420 with respect to the dataform 434 is fixed. Data representative of the predetermined position may be encoded in the dataform or may be preprogrammed into the portable data collection device's application software. Also included in the dataform are certain distinguishing features that permit locating the dataform 434 in the target area, for example, the "bulls eye" mark at the MaxiCode center.

Other dataform formats would include different distinguishing features such a guard bar for PDF417 or Super Code dataforms or orientation markers for data matrix dataforms. As a result of the predetermined position data in conjunction with the distinguishing features of the dataform, the location, size and/or orientation of the signature block 420 within the target area 44 is determined at step 514, is determined. At step 516, a digital representation of the portion of the image corresponding to the signature block 420 is coupled to the image compression circuitry 294 for data compression.

The compressed image data representing the signature block 420 and at least a portion of the decoded dataform data are output to the serial output circuitry 296, at step 518, for subsequent transmission by the radio module 314 to a remote device. At step 520, the green LED 32 is energized for a predetermined time signaling to the operator that the dataform 434 was successfully decoded and an image of the signature block 420 was successfully captured and output, to the serial output circuitry 296. If the captured frame is not decodeable at step 510, the red LED 30 is energized for a predetermined time to inform the operator that the read was unsuccessful and to maintain the dataform reading trigger 26 depressed and keep the data collection device 10 aimed at the dataform 434 until a successful read is obtained.

It should be appreciated that because the predetermined positional data for a desired image area such as a signature block located at a predetermined position with respect to a dataform may be preprogrammed into the portable data collection device, digital image data of a portion of the desired image area may be output without the necessity of decoding the dataform. After storing a digital representation of the target area 44 and locating the distinguishing features of the dataform 434, the location of the signature block 420 can be calculated based on the pre-programmed predetermined position data and the location of the distinguishing features of the dataform.

Regardless of whether predetermined positional data is preprogrammed into the data collection device 10 or encoded in the dataform. There will be uses for the device 10 this invention wherein only some of the codes will have associated desired image areas. Therefore, it is desirable for a dataform to include an indication as to whether there exists an associated desired image area to be captured and output. The indication may be encoded in the dataform or the dataform format itself may be the indication. For example, all MaxiCode formats may be known to have an associated desired image area which is to be captured and output.

In the signature block placement of FIG. 33, the block is centered below the dataform 434 at a distance "g" from the dataform. The height of the block is H and the width is W. The dataform is of a predetermined size having a height "Y". To locate the signature block 420 in the target field 44, coordinate locations of the center $(x_c, y_c)$ and the height of the dataform "Y" are determined in the pixel coordinate domain. Then, the formulas for calculating the positions of the four corners of the signature box in the pixel coordinate domain are as follows:

Upper-left corner: $(x_l-x_c, y_u-y_c)=(-W/2, y/2+g)$

Upper-right corner: $(x_r-x_c, y_u-y_c)=(W/2, Y/2+g)$

Lower-left corner: $(x_l-x_c, y_l-y_c)=(-W/2, Y/2+g+H)$

Lower-right corner: $(x_r-x_c, y_l-y_c)=(W/2, Y/2+g+H)$

The formulas to correct each x or y value for angular rotation θ is as follows:

$(x')=(\cos θ-\sin θ)(x-x_c)+(x_c)$ $(y_l)=(\sin θ-\cos θ)(y-y_c)+(y_c)$

First Alternate Embodiment of Focusing Assembly of Optic Assembly

An alternate embodiment of the focusing assembly is shown in FIG. 42 generally at 900. Components that have the same structure as the corresponding components described with respect to the focusing assembly 800 disclosed above will be assigned reference numbers followed by a prime (') which are the same as corresponding reference numbers in the first embodiment. For example, the focusing optic 810' of the focusing assembly 900 is identical in structure and function as the focusing optic 810 of the focusing assembly 800. The focusing assembly 900 includes a focusing optic 810' comprising two wedge shaped lens 820', 830' which are congruent in shape and supported in a lens support fixture (not shown but identical to the lens support fixture 840 of the focusing assembly 800 described above). The lens 820' is moveable with respect to the lens 830' along a path of travel T' to change the thickness t' of the focusing optic 810' as described above with respect to lens 820, 830 in the focusing assembly 800.

The focusing assembly 900 includes a drive assembly 960 to move the moveable lens 820' along the path of travel T'. The drive means 960 includes a rod 962 having one end 964 attached to a base surface 829' of the lens 820'. An opposite end 966 of the rod 962 defines a pin 968 extending vertically above and below upper and lower surfaces of the rod 962. A V-shaped pivoting member 970 includes an oval shaped opening 972 in an end portion of one arm 974. The end portion of the arm 974 is defines a slotted opening 975 as can best be seen in FIG. 42A. The end portion 966 of the rod 962 fits within the slotted opening 975 and pin 968 slidingly fits within the oval shaped opening 972 to pivotally secure the rod 962 to the V-shaped pivoting member 970. A second arm 976 of the V-shaped pivoting member 970 includes a pin 978 which slides within a slot shaped opening 979 in a rearward facing portion of a slider 980. The V-shaped pivoting member 970 is supported on a vertical post 982 extending from an inner surface 16a of the housing snout 16. The V-shaped pivoting member 970 pivots about a pin 984 extending vertically upwardly from the post 982.

A portion 986 of the slider 980 extends through a slotted opening 988 in a side of the snout 16. The slider 980 is slidably confined between a pair of parallel ledges 990, 992 which extend outwardly from the inner surface 16a of the housing snout 16. The ledges have vertical lip portions 990a, 990b (FIG. 42A) to further confine the slider 980. As the slider portion 986 is moved along the slotted opening 988 in a direction labeled R in FIG. 42, the V-shaped pivoting member 970 pivots in a clockwise direction labeled C about the pin 984. This causes the rod 962 to move in direction labeled D and also causes the moveable lens 820' to move in the direction D along its path of travel T'. Movement of the lens 820' in the direction D causes the thickness t' of the focusing optic 810' to increase.

Second Alternate Embodiment of Focusing Assembly of Optic Assembly

Figure 43:
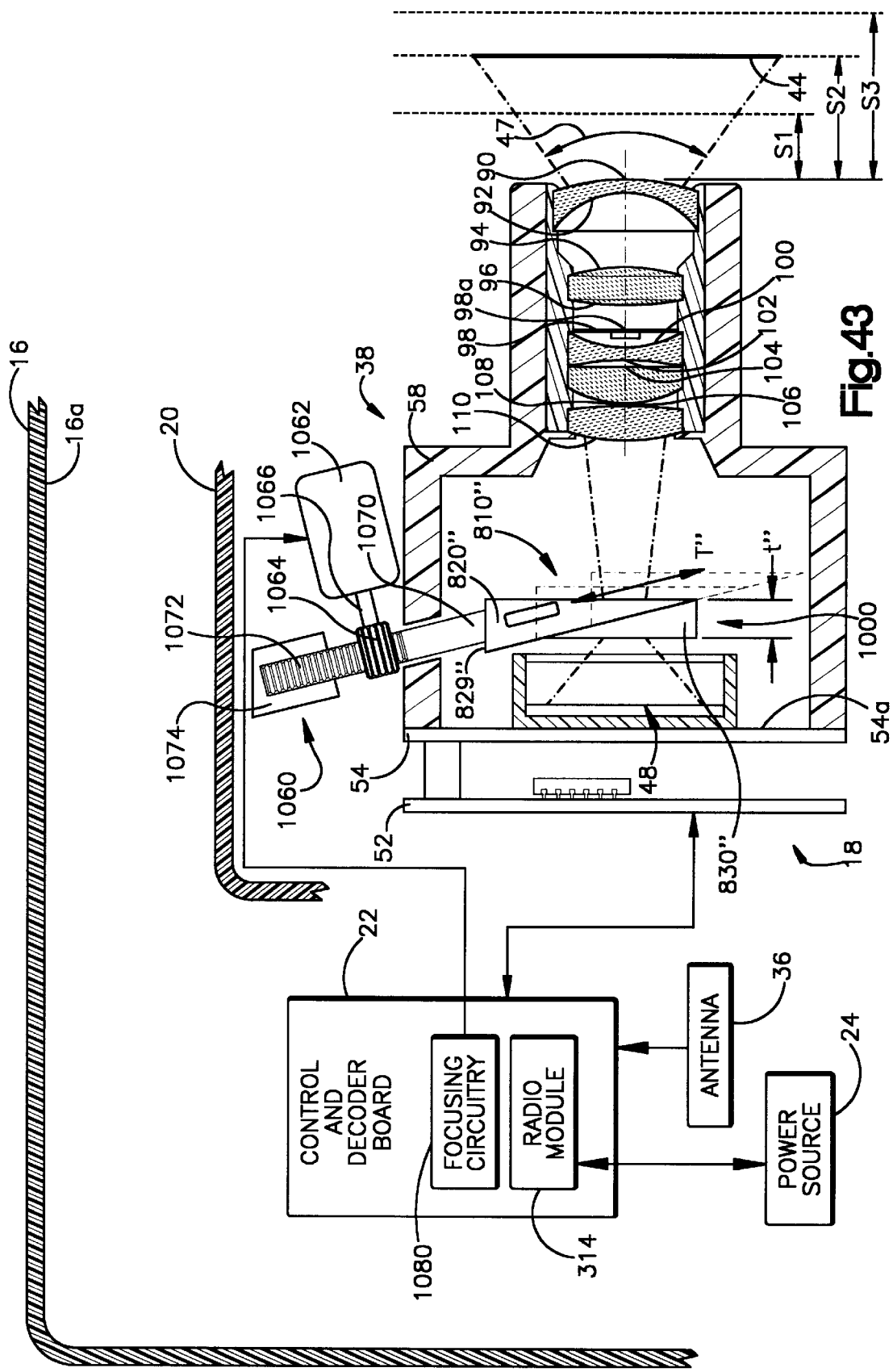
FIG. 43 is a schematic sectional view of an optic assembly of the modular portion of the imaging assembly of FIG. 8 including another alternate embodiment of a focusing assembly.

A second alternate embodiment of the focusing assembly is shown in FIG. 43 generally at 1000. Again, components that have the same structure as the corresponding components described with respect to the focusing assemblies 800, 900 disclosed above will be assigned reference numbers followed by a double prime (") which are the same as corresponding reference numbers in the first embodiment. For example, the focusing optic 810" of the focusing assembly 1000 is identical in structure and function as the focusing optic 810 of the focusing assembly 800. The focusing assembly 1000 includes a focusing optic 810" comprising two wedge shaped lens 820", 830"' which are congruent in shape and supported in a lens support fixture (not shown but identical to the lens support fixture 840 of the focusing assembly 800 described above). The lens 820' is moveable with respect to the lens 830' along a path of travel T" to change the thickness t" of the focusing optic 810' as described above with respect to lens 820, 830 in the focusing assembly 800. The focusing assembly 1000 includes a drive assembly 1060 to move the moveable lens 820" along the path of travel T". The drive means 1060 includes a stepper motor 1062 having a pinion gear 1064 mounted to one end of the motor shaft 1066. A rack 1070 is coupled to an end 829" of the moveable lens 820". A drive portion 1072 of the rack 1070 includes linear gearing that meshes with the pinion gear 1064 of the stepper motor 1062. The rack 1070 slides in a grooved portion of a support 1074 extending from the modular housing 20. The stepper motor 1062 is configured to precisely rotate the motor shaft 1066 in either the clockwise or counterclockwise directions in increments (or steps) of 1/36 of a revolution (10 degree increments) thus providing precise control over the position of the lens 820" along its path of travel T".

Figure 44A:
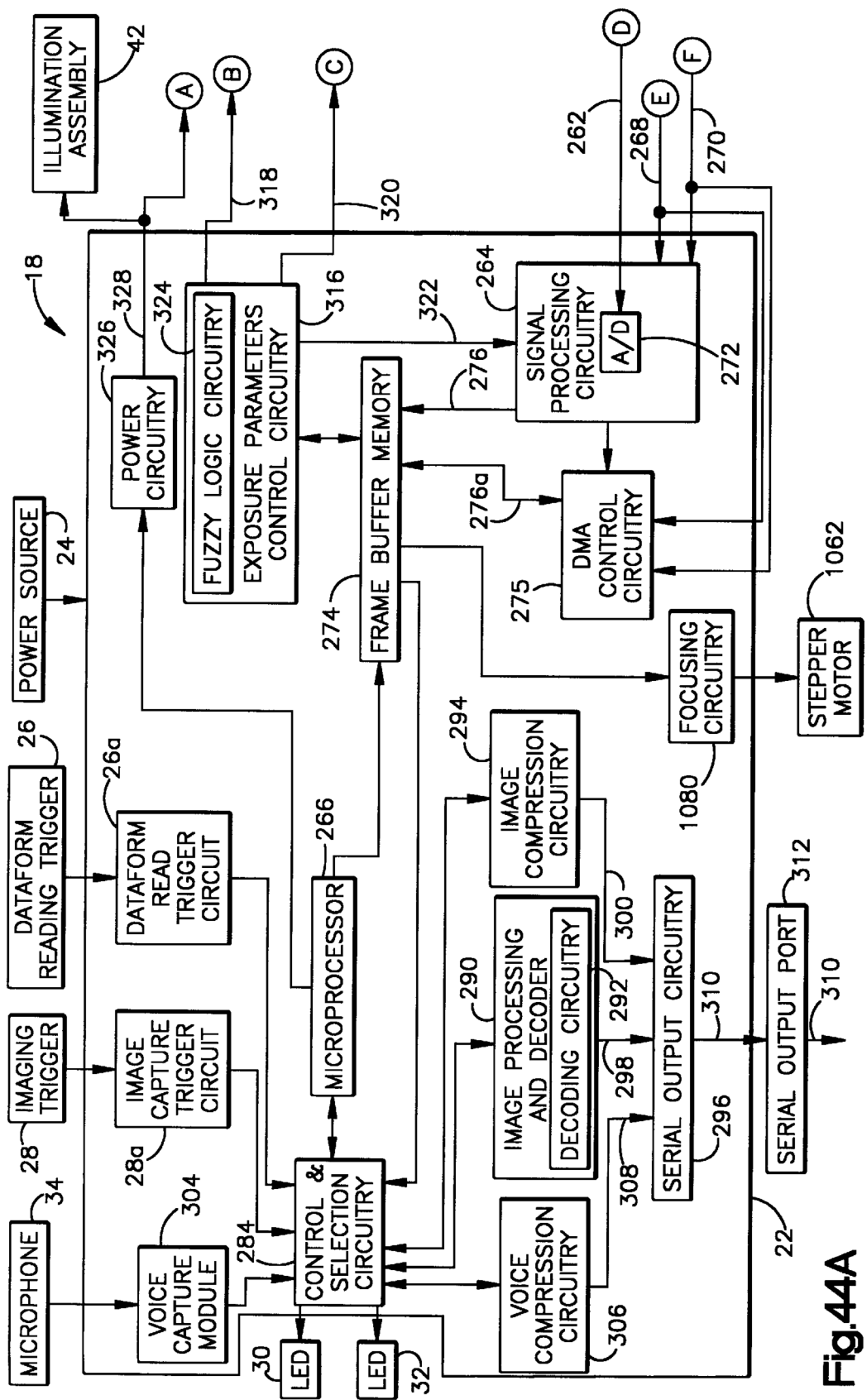
FIG. 44A is one portion of a block diagram of selected circuitry of the portable data collection device of the present invention including the focusing assembly shown in FIG. 43.
Figure 44B:
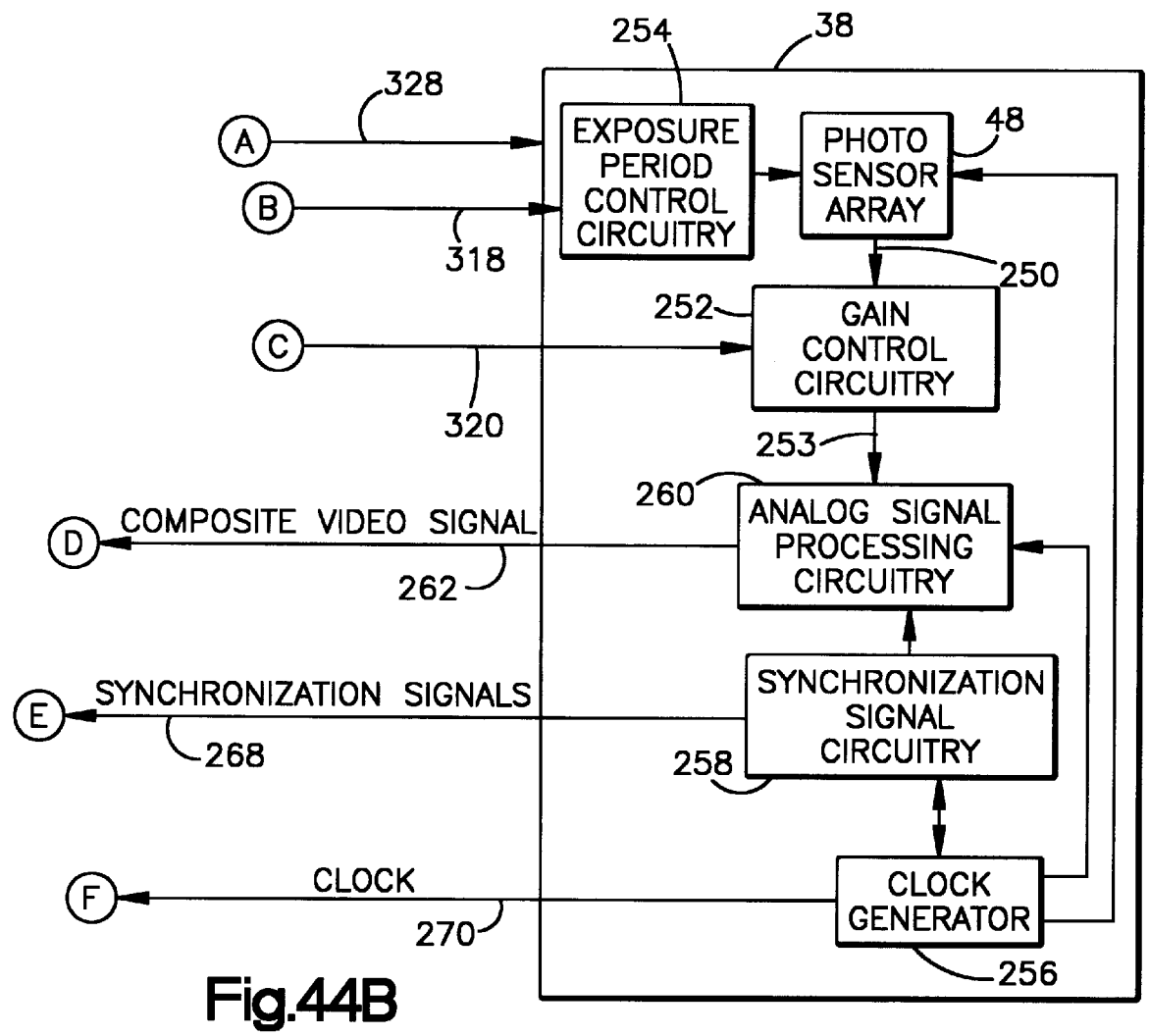
FIG. 44B is a second portion of a block diagram of selected circuitry of the portable data collection device of the present invention, the second portion matching the first portion shown in FIG. 44A.

The stepper motor 1064 is controlled by focusing circuitry 1080 mounted on the control and decoder board. As be seen schematically in FIG. 44A, the focusing circuitry 1080 receives input from the frame buffer memory 274 an analyzes the sharpness of successive captured image frames. When the focusing circuitry 1080 determines that the sharpness of a captured frame has fallen below a predetermined value, the circuitry takes corrective action by moving actuating the stepper motor 1062 and rotating the shaft 1066 in 10 degrees increments such that the rack 1070 moves the lens 820" in a predetermined direction along its path of travel T". Captured frames are continuously analysed by the focusing circuitry, when the sharpness of a captured image frame exceeds the predetermined value, the rotation of the shaft 1066 is halted by the focusing circuitry 1080 and the lens 820" remains stationary so long as frame sharpness continues to exceed the predetermined image sharpness value.

If acceptable sharpness is not achieved by the time the lens 820" reaches an endpoint along it path of travel T", the focusing circuitry 1080 reverses the rotation of the stepper motor shaft 1064 and moves the lens 820" in a direction toward its opposite path of travel endpoint. When the sharpness of a captured image frame exceeds the predetermined image sharpness value, movement, rotation of the shaft 1066 is halted as explained above.

Alternate Embodiment of Illumination Assembly

Figure 19:
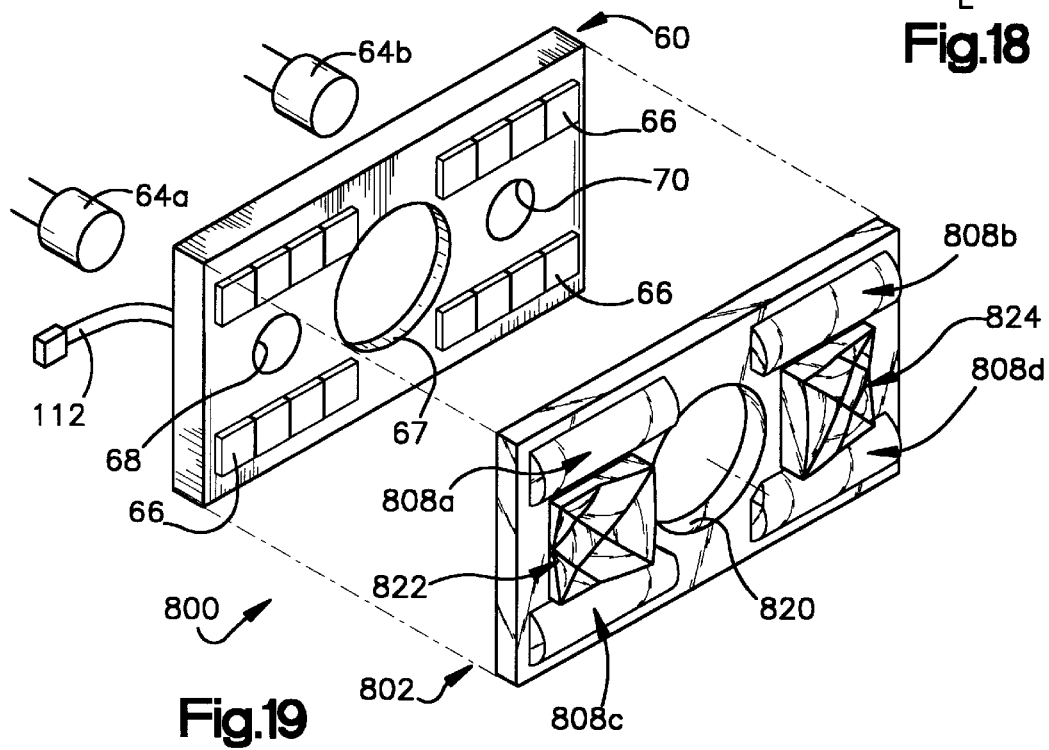
FIG. 19 is an exploded perspective view of an alternate embodiment of an illumination assembly of the modular portion of the imaging assembly of the present invention.
Figure 23:
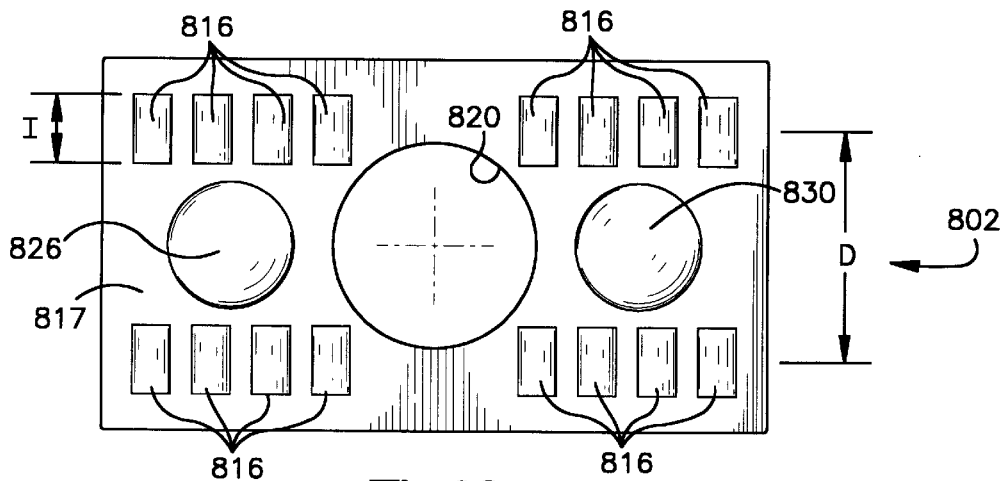
FIG. 23 is a back elevation view of the front panel of FIG. 20.

An alternate embodiment of an illumination assembly suitable for use in the modular portion 20 of the imaging assembly 18 of the portable data collection device 10 is shown generally at 800 in FIG. 19. The illumination assembly 700 includes a printed circuit board assembly similar to the printed circuit board assembly 60 described above. For simplicity, the same reference numbers are used to identify components of the printed circuitry board assembly shown in FIG. 11 corresponding to the printed circuit board assembly 60 described above. Referring to FIG. 19, the printed circuit board assembly 60 includes a plurality of surface mount exposure illumination LEDs 66. A single piece acrylic or polycarbonate lens array 802, fabricated, preferably, from PMMA is positioned between the printed circuit board assembly 60 and the target area 44 (FIGS. 5 and 10) for directing the illumination from the exposure LEDs 66 towards the target area 44. The lens array 802 is similar to the lens array 62 but provides for generation of a targeting illumination frame pattern FR (FIG. 32) which frames or surrounds the generated illumination crosshair pattern CR discussed in connection with the lens array 702. As can be seen in FIG. 10 with respect to the previously described lens array 62, the lens array 802 functions as a front panel for the modular portion 20 of the imaging assembly. The printed circuit board assembly 60 includes printed conductors and a power lead 112 operative for supplying power to the illumination LEDs 66. A suitable surface mount illumination LED is produced by the Mark-Tech Corporation of Latham, N.Y., as Part No. MTSM735K-UR or MTSM745KA-UR. Each illumination LED 66 provides illuminosity of 285 milli candela (mcd) over an angular illumination field of about 68 degrees. The small footprint of each illumination LED. 66 enables four LEDs to be placed in a row measuring less than 14 mm. The printed circuit board assembly 60 includes four banks of four illumination LEDs 66 totaling sixteen illumination LEDs providing 4560 mcd of uniform illumination over the target area 44. A central opening 67 in the printed circuit board assembly 60 provides an opening for the shroud 58 to extend through.

The lens array 802 includes four illumination optic portions 808a, 808b, 808c, 808d (FIG. 39) which are identical in dimension and optic prescription to the illumination optic portions 88a, 88b, 88c, 88d of lens array 62. Each of the illumination optic portions 808a, 808b, 808c, 808d are aligned with a corresponding bank of illumination LEDs 66. The illumination optic portions 808a, 808b, 808c, 808d direct a 68 degree angular illumination field from each illumination LED 66 into a uniform field having an angular field of view which substantially corresponds to the angular field of view of the optic assembly 43 which defines the target area 44.

Figure 24:
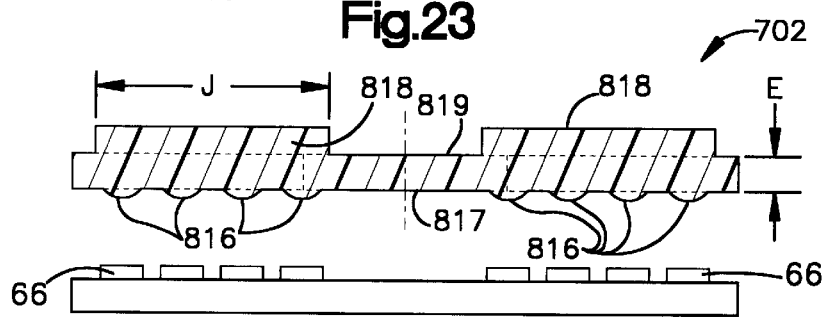
FIG. 24 is a sectional view of the front panel of FIG. 20 as seen from a plane indicated by the line 24—24 in FIG. 22.
Figure 25:
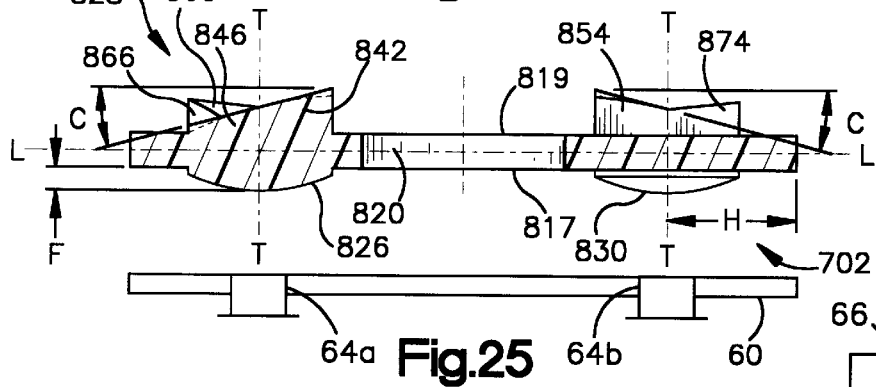
FIG. 25 is a sectional view of the front panel of FIG. 20 as seen from a plane indicated by the line 25—25 in FIG. 22.
Figure 26:
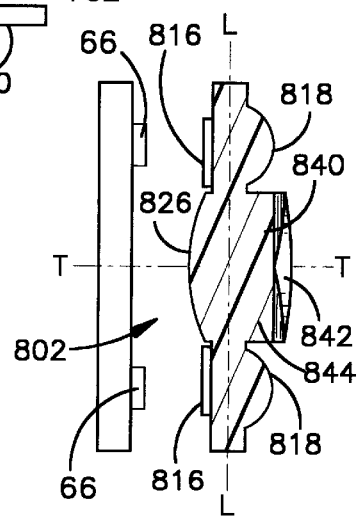
FIG. 26 is a sectional view of the front panel of FIG. 20 as seen from a plane indicated by the line 26—26 in FIG. 22.

Referring to FIGS. 24 and 26, which show a horizontal cross section (FIG. 24) and a vertical cross section (FIG. 26) through the illumination optic portions 808a, 808b, 808c, 808d, it can be seen that each optic portion comprises a lens including four vertically oriented cylindrical entry optic surfaces 816 extending from a back side 817 (FIG. 24) of the lens array 802. One vertically oriented cylindrical entry surface 816 is positioned in front of a corresponding LED 66. Each optic portion 808a, 808b, 808c, 808d also includes a horizontally oriented cylindrical optic exit surface 818 extending from a front side 819 (FIG. 22) of the lens array 802. One horizontally oriented cylindrical exit optic surface 818 is positioned in front of each bank of four LEDs 66. The vertically oriented cylindrical entry optic surfaces 816 define the horizontal field of illumination and the horizontally oriented cylinders 818 define the vertical field of illumination. This arrangement provides an even illumination intensity distribution across the target area 44. The 4560 mcd of illumination provided by the illumination LEDs 66 will provide an illumination intensity in excess of 106 lux when the target object 45 is at a distance of 8.5 inches from the optic surface 90 of the lens 43*a*. The vertically oriented entry surfaces 816 have a radius of curvature of 2.50 mm. and a height I (FIG. 23) of 4.00 mm while the horizontally oriented exit surfaces 818 have a radius of curvature of 3.00 mm. and a width J (FIG. 24) of 13.75 mm. Referring to FIGS. 24–26, suitable dimensions for the lens array 802 are as follows:

| Label | Description | Dimension |
|---|---|---|
| A | Height of lens array 802 | 21.75 mm. |
| B | Width of lens array 802 | 39.55 mm. |
| C | Diameter of center opening 820 of lens array 802 | 12.00 mm. |
| D | Height between middle of vertical entry surfaces 816 | 14.13 mm. |
| E | Thickness of lens array 802 | 1.95 mm. |
| F | Maximum extension of aspheric light exit surfaces 726, 730 from back side 717 of lens array | 1.75 mm. |
| G | Distance between maximum extension of aspheric light exit surfaces 726, 730 and center of respective segmented light exit surfaces 728, 732 along centerlines T-T | 5.25 mm. |
| H | Distance between centerlines T-T and outer edge of lens array 702 | 7.80 mm. |
| I | Height of vertically oriented entry surfaces 816 | 4.00 mm. |
| J | Width of horizontally oriented exit surfaces 718 | 13.75 mm. |

Referring again to FIG. 19, the illumination assembly also includes a targeting arrangement or assembly to aid in aiming the device 10 at the target object 45. The targeting assembly includes the targeting LED illuminators 64*a*, 64*b*, which extend into apertures 68, 70 in the printed circuit board assembly 60 and, when energized, project illumination into first and second targeting optics 822, 824 respectively of the lens array 62. The first and second targeting optics 822, 824 are mirror images of each other and are identical in configuration.

As shown in FIG. 30, the targeting optic 822 generates a crosshair pattern of illumination CR1 and a half frame FR1 pattern of illumination. As shown in FIG. 31, the targeting optic 824 generates a crosshair pattern of illumination CR2 and a half frame pattern of illumination FR2. When the device 10 is properly focused on the target object 45 at the minimum best focus position MIN S2 of the optic assembly 43 and properly oriented such that the lens array 802 is substantially parallel with the target object 45, the crosshair patterns of illumination CR1, CR2 coincide or overlap to form a crosshair pattern of illumination CR, just like the crosshair pattern CR formed by the lens array 702. As can be seen in FIG. 32, the crosshair pattern CR is characterized by a horizontal portion of width w (18 mm.), a vertical portion of height h (18 mm.) and a thickness of the pattern of illumination of t. Furthermore, the half frame patterns of illumination FR1, FR2 are configured as complementary halves of a rectangle which form a full frame pattern of illumination FR as shown in FIG. 32 which frames or surrounds the crosshair pattern CR. Like the crosshair pattern of illumination, the frame pattern of illumination FR is not a line but an illumination intensity pattern having a thickness represented in FIG. 32 by the distance labeled T. At the minimum best focus position MIN S2, the frame pattern of illumination FR has a vertical height of 60 mm. labeled H in FIG. 32 which is substantially equal to the height of the target area 44 at the minimum best focus position MIN S2 and a horizontal span of 80 mm. labeled W in FIG. 32 which is substantially equal to the width of the target area 44 at the minimum best focus position MWN S2.

The first and second targeting optics 822, 824, which are identical in configuration, are shown in cross section in FIGS. 25 and 26. The first targeting optics 822 comprises a lens with an aspherical light entry optic surface 826 and a segmented cylindrical light exit optic surface 828. The second targeting optics 824 comprises a lens with an aspherical light entry optic surface 830, similar to the aspherical light entry optic surface 826, and a segmented cylindrical light exit optic surface 832, similar to the segmented cylindrical light exit optic surface 828.

The aspherical entry surfaces 826, 830 each have a diameter of 8 mm., a radius of curvature of 2.890 mm. and a conic constant of −2.534. The segmented cylindrical light exit surfaces 828, 832 each have an 8.0 mm. by 8.0 mm. square shaped outer perimeter. The segmented cylindrical surface 828 is comprised of four triangular shaped sections 840, 842, 844, 846 (FIG. 22) while the segmented cylindrical surface 832 is divided into four triangular shaped sections 850, 852, 854, 856, wherein sections 840 and 850 are identical, sections 842 and 852 are identical, sections 844 and 854 are identical and 846 and 856 are identical.

The upper triangular section 840 comprises a vertically oriented cylindrical light exit optic surface with a triangular shaped corner region 860 having a horizontally oriented cylindrical light exit optic surface (radius of curvature 25.00 mm.) in the upper left hand corner as seen in FIG. 22. The vertically oriented cylindrical light exit optic surface of the upper triangular section 840 (not including the corner region 860) is similar in optic configuration to upper triangular section 740 described above.

The lower triangular section 844 also comprises a vertically oriented cylindrical light exit optic surface with a triangular shaped corner region 864 having a horizontally oriented cylindrical light exit optic surface (radius of curvature 25.00 mm.) in the lower left hand corner as seen in FIG. 22. The vertically oriented cylindrical light exit optic surface of the lower triangular section 844 (not including the corner region 864) is similar in optic configuration to lower triangular section 744 described above.

The right triangular section 842 comprises a horizontally oriented cylindrical light exit optic surface and is similar in optic configuration to the right triangular section 742 discussed above. The left triangular section 846 comprises a horizontally oriented cylindrical light exit optic surface with first and second triangular regions 866, 867. The horizontally oriented cylindrical light exit optic surface of the left triangular section 846 (not including the corner regions 866, 867) is similar in optic configuration to the left triangular section 746 discussed above. The triangular region 866 is adjacent triangular corner region 860 and comprises a vertically oriented cylindrical light exit optic surface (radius of curvature 25.00 mm.). The triangular region 867 is adjacent triangular corner region 864 and comprises a vertically oriented cylindrical light exit optic surface (radius of curvature 25.00 mm.).

The upper triangular section 850 comprises a vertically oriented cylindrical light exit optic surface with a triangular shaped corner region 870 having a horizontally oriented cylindrical light exit optic surface (radius of curvature 25.00 mm.) in the upper right hand corner as seen in FIG. 22. The vertically oriented cylindrical light exit optic surface of the upper triangular section 850 (not including the corner region 870) is similar in optic configuration to upper triangular section 750 described above.

The lower triangular section 854 also comprises a vertically oriented cylindrical light exit optic surface with a triangular shaped corner region 874 having a horizontally oriented cylindrical light exit optic surface (radius of curvature 25.00 mm.) in the lower right hand corner as seen in FIG. 22. The vertically oriented cylindrical light exit optic surface of the lower triangular section 854 (not including the corner region 874) is similar in optic configuration to lower triangular section 754 described above.

The left triangular section 852 comprises a horizontally oriented cylindrical light exit optic surface and is similar in optic configuration to the left triangular section 752 discussed above. The right triangular section 856 comprises a horizontally oriented cylindrical light exit optic surface with first and second triangular regions 876, 877. The horizontally oriented cylindrical light exit optic surface of the right triangular section 856 (not including the corner regions 876, 877) is similar in optic configuration to the right triangular section 756 discussed above. The triangular region 876 is adjacent triangular corner region 870 and comprises a vertically oriented cylindrical light exit optic surface (radius of curvature 25.00 mm.). The triangular region 877 is adjacent triangular corner region 874 and comprises a vertically oriented cylindrical light exit optic surface (radius of curvature 25.00 mm.).

The optic surfaces of the corner regions 860, 864, 866, 867 are tilted with respect to the optic surfaces of their corresponding triangular sections 840, 844, 846 such that illumination from the targeting LED 64a is focused through the corner region optic surfaces to generate the half frame illumination pattern FR1. Similarly, the optic surfaces of the corner regions 870, 874, 876, 877 are tilted with respect to their corresponding triangular sections 850, 854, 856 such that illumination from the targeting LED 64b is focused through the corner region optic surfaces to generate the half frame illumination pattern FR2. The tilt angles of corner regions 860 and 866 will be examined. The same tilt angles are correspondingly used for all the other corner regions and the discussion will not be repeated for each region.

Prior to discussing the tilt angles of the corner regions 860, 864, it is important to note that the light exit optic surfaces of the triangular sections 840, 842, 844, 846, 850, 852, 854, 856 have optical surfaces with the angle of tilt (9.85 degrees) discussed in detail with respect to the lens array 702 above. Thus, the triangular sections 840 and 846 have optical surfaces with a 9.85 degree angle of tilt downwardly (as viewed in FIG. 25) toward the front side 819 of the lens array 802.

Figure 25A:
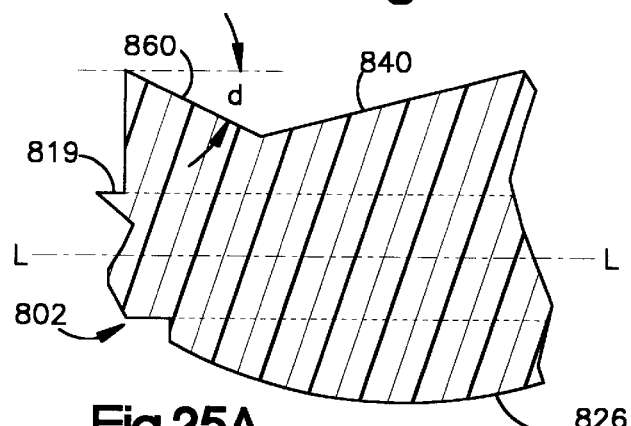
FIG. 25A is an exploded section view of a portion of the front panel shown in FIG. 25 as seen from a plane indicated by the line 25A—25A in FIG. 22.

The corner regions 860, 866 and the triangular sections 840, 846 are symmetric about the diagonal line 880. As can best be seen in FIG. 25A, the optical surfaces of the corner regions 860, 866 are tilted at an angle labeled d of 11.50 degrees with respect to horizontal axis (axis L-L). The tilt angle of the corner regions is opposite of the tilt angle of the triangular sections 840, 846.

At the minimum best focus position MIN S2 of 140 mm. (5.5 inches) in front of the optic surface 90, the frame illumination pattern FR has an approximate height h of 60 mm. (2.4 in.) and an approximate width w of 80 mm. 3.2 in.) which corresponds to the dimensions of the target area 44 at the best focus position S2. At the minimum best focus position MIN S2, the target area 44 has a height of 62 mm. (2.4 in.) and a width of 82 mm. 3.2 in.). As was the case in the illumination assembly embodiment including the lens array 702, the crosshair illumination pattern CR has a height of 18 mm. and a width of 18 mm. at the minimum best focus position MIN S2.

While the description has described the currently preferred embodiments of the invention, those skilled in the art will recognize that other modifications may be made without departing from the invention and it is intended to claim all modifications and variations as fall within the scope of the invention.

In compliance with the statute, the invention has been described in language more or less specific as to structural and methodical features. It is to be understood, however, that the invention is not limited to the specific features shown and described, since the means herein disclose comprise preferred forms of putting the invention into effect. The invention is, therefore, claimed in any of its forms or modifications within the proper scope of the appended claims appropriately interpreted in accordance with the doctrine of equivalents.

What is claimed is:

1. A portable data collection device comprising:
   a) a camera assembly, including an array of photosensor elements generating a signal representative of an image of a target area, the image including a dataform positioned in the target area; and
   b) an optic assembly positioned to focus illumination reflected from a generally rectangular target area onto the array of photosensor elements, the optic assembly including a focusing optic through which reflected illumination from the target area passes, the focusing optic having a moveable lens, movement of the moveable lens changing a thickness of the focusing optic through which the reflected light passes and correspondingly changing a best focus distance of the optic assembly wherein the best focus distance corresponds to a distance between the device and the dataform which results in a clear image of the dataform being focused onto the array of photosensor elements.

2. The portable data collection device of claim 1 wherein the focusing optic includes a moveable lens and a stationary lens configured such that moving the moveable lens with respect to the stationary lens along a path of travel of the moveable lens changes the thickness of the focusing optic through which the reflected light passes and correspondingly changes the best focus distance.

3. The portable data collection device of claim 2 wherein the moveable lens and the stationary lens are comprised of wedge shaped pieces of glass each having an inclined surface and wherein the inclined surfaces are in sliding contact.

4. The portable data collection device of claim 3 wherein the focusing optic is part of a focusing assembly which includes structure operatively connected to the moveable optic to move the moveable optic along its path of travel.

5. The portable data collection device of claim 1 further including an illumination assembly directing illumination towards the target area, the illumination assembly including a targeting arrangement for directing an illumination targeting pattern aid in aiming the portable data collection device, the targeting arrangement including first and second targeting light emitting diodes and first and second targeting optics, the first targeting optics positioned adjacent the first targeting light emitting diode and generating a first illumination targeting pattern and the second targeting optics positioned adjacent the second targeting light emitting diode and generating a second illumination targeting pattern, the first and second targeting pattern substantially coinciding to form a single illumination targeting pattern when the device is at a minimum distance best focus position.

6. The portable data collection device of claim 5 wherein the first targeting optics includes a light entry optic surface facing the first targeting light emitting diode and a light exit optic surface directed toward the target area and wherein the second targeting optics includes a light entry optic surface facing the second targeting light emitting diode and a light exit optic surface directed toward the target area and further wherein the light entry optic surfaces of each of the first and second targeting optics comprise aspheric optic surfaces.

7. The portable data collection device of claim 6 wherein the light exit optic surface of each of the each of the first and second targeting optics comprise a plurality of cylindrical surfaces.

8. The portable data collection device of claim 5 wherein the first and second targeting optics are supported in a panel having a generally planar front surface which faces the target area and wherein the light exit optic surface of each of the first and second targeting optics is tilted with respect to the generally planar front surface of the panel.

9. The portable data collection device of claim 8 wherein an angle of tilt of the first targeting optics light exit optic surface with respect to the generally planar front surface of the panel is substantially equal to an angle of tilt of the second targeting optics light exit optic surface with respect to the generally planar front surface of the panel.

10. The portable data collection device of claim 9 wherein the first targeting optics light exit optic surface comprises first and second vertically oriented cylindrical optic surfaces and first and second horizontally oriented cylindrical optic surfaces and wherein the targeting pattern generated by the first targeting optics is a crosshair pattern and further wherein the second targeting optics light exit optic surface comprises first and second vertically oriented cylindrical optic surfaces and first and second horizontally oriented cylindrical optic surfaces and wherein the targeting pattern generated by the second targeting optics is a crosshair pattern.

* * * * *